United States Patent
Osborne et al.

(10) Patent No.: US 7,664,872 B2
(45) Date of Patent: Feb. 16, 2010

(54) MEDIA TRANSFER PROTOCOL

(75) Inventors: Roland Osborne, Walnut Creek, CA (US); Alexander van Zoest, San Diego, CA (US); Aaron Robinson, San Diego, CA (US); Brian Fudge, San Diego, CA (US); Mayur Srinivasan, San Diego, CA (US); Kevin Fry, Poway, CA (US)

(73) Assignee: DIVX, Inc., San Diego, CA (US)

( * ) Notice: Subject to any disclaimer, the term of this patent is extended or adjusted under 35 U.S.C. 154(b) by 633 days.

(21) Appl. No.: 11/323,062

(22) Filed: Dec. 30, 2005

(65) Prior Publication Data
US 2006/0174021 A1 Aug. 3, 2006

Related U.S. Application Data

(63) Continuation-in-part of application No. 11/198,142, filed on Aug. 4, 2005.

(60) Provisional application No. 60/642,065, filed on Jan. 5, 2005.

(51) Int. Cl.
*G06F 15/16* (2006.01)

(52) U.S. Cl. ............... 709/232; 709/230; 709/231; 709/203; 709/217; 709/218; 709/219; 710/61; 370/324

(58) Field of Classification Search ............ 709/203, 709/217–219, 230–232; 710/61; 370/324
See application file for complete search history.

(56) References Cited

U.S. PATENT DOCUMENTS 5,778,181 A 7/1998 Hidary et al.
5,819,034 A 10/1998 Joseph et al.
5,822,524 A 10/1998 Chen et al.
6,288,739 B1 9/2001 Hales et al.
6,490,627 B1 * 12/2002 Kalra et al. .............. 709/231

(Continued)

FOREIGN PATENT DOCUMENTS

| WO | WO/00/31982 | 6/2000 |
| WO | WO/02/47354 A2 | 6/2002 |
| WO | WO/02/103470 A2 | 12/2002 |
| WO | WO 2004028156 A1 * | 4/2004 |

OTHER PUBLICATIONS

Multimedia Streaming Services: Specification, Implementation, and Retrieval by Althun et al., Proceedings of the 5th ACM SIGMM international workshop on Multimedia information retrieval, Nov. 2003.*

(Continued)

*Primary Examiner*—Ashok B. Patel
*Assistant Examiner*—Linglan Edwards
(74) *Attorney, Agent, or Firm*—Kauth, Pomeroy, Peck & Bailey LLP

(57) ABSTRACT

A computer device selected as a media server is connected to a consumer electronic (CE) device over multiple media transfer channels. The multiple media transfer channels together with an improved media transfer protocol allow for efficient, real-time transfer of different types of digital media, in various combinations, for playing on the CE device. Each type of media is transferred over its own dedicated channel according to its individual data rate. The improved media transfer protocol allows the data to be transmitted in either an asynchronous mode or a synchronous stream or timestamp mode depending on whether synchronization is desired. A dedicated control channel allows for the transfer of control information from the CE device to the media server as well as for resynchronizing media position of the server upon a change in play mode of the corresponding media.

10 Claims, 15 Drawing Sheets

U.S. PATENT DOCUMENTS

| | | | |
|---|---|---|---|
| 6,714,723 | B2 | 3/2004 | Abecassis |
| 6,832,241 | B2 | 12/2004 | Tracton et al. |
| 7,010,492 | B1 | 3/2006 | Bassett et al. |
| 2002/0013852 | A1* | 1/2002 | Janik .......................... 709/231 |
| 2002/0178278 | A1* | 11/2002 | Ducharme .................. 709/231 |
| 2002/0178279 | A1 | 11/2002 | Janik et al. |
| 2004/0111526 | A1* | 6/2004 | Baldwin et al. ............. 709/231 |
| 2004/0117377 | A1 | 6/2004 | Moser et al. |
| 2004/0133668 | A1* | 7/2004 | Nicholas, III ............... 709/223 |
| 2004/0172658 | A1* | 9/2004 | Rakib et al. ................. 725/120 |
| 2004/0221056 | A1* | 11/2004 | Kobayashi .................. 709/232 |
| 2004/0255329 | A1 | 12/2004 | Compton et al. |
| 2005/0080915 | A1* | 4/2005 | Shoemaker et al. ......... 709/231 |
| 2005/0228897 | A1 | 10/2005 | Yamamoto et al. |
| 2006/0047844 | A1 | 3/2006 | Deng |
| 2006/0080454 | A1 | 4/2006 | Li |

OTHER PUBLICATIONS

*Real-time Transport Protocol*; Wikipedia; Jun. 26, 2006; 2 pages.
*Real Time Streaming Protocol*; Wikipedia; May 23, 2006; 2 pages.
*Welcome to the UPnP Forum!*; Contributing Members of the UPnP Forum; (1999-2006); 2 pages.
*Intel® Networked Media Product Requirements Enables Digital Home Interoperability*; Intel Corporation; Technology Backgrounder/Consumer Electronics; (2004); 4 pages.
International Search Report for International Application PCT/US05/47478 filed Dec. 30, 2005; report completed Jul. 25, 2007; mailed Jun. 19, 2008; 3 pages.
Written Opinion for International Application PCT/US05/47478 filed Dec. 30, 2005; report completed Jun. 2, 2008; mailed Jun. 19, 2008; 5 pages.
Broadq—The Ultimate Home Entertainment Software, printed May 11, 2009 from ittp://web.srchive.org/web/20030401122010/www.broadq.com/qcasttuner/, 1 pg.
Qtv—About BroadQ, printed May 11, 2009 from http://www.broadq.com/en/about.php, 1 pg.
QCast Tuner for PS2, printed May 11, 2009 from http://web.archive.org/web/20030210120605/www.divx.com/software/detail.php?ie=39, 2 pgs.
International Search Report for International Application No. PCT/US05/047661 filed Dec. 30, 2005; report completed Oct. 1, 2006; mailed Dec. 18, 2006; 2 pgs.
Written Opinion for International Application No. PCT/US05/047661 filed Dec. 30, 2005; report completed Oct. 1, 2006; mailed Dec. 18, 2006; 4 pgs.
International Search Report for International Application No. PCT/US2005/047533 filed Dec. 30, 2005, completed Jun. 10, 2006, mailed Jul. 20, 2006, 3 pgs.
Written Opinion of the International Searching Authority for International Application No. PCT/US2005/047533 filed Dec. 30, 2005, completed May 12, 2006, mailed Jul. 20, 2006, 3 pgs.
Leung et al., "Design of an interactive Video-on-Demand System", IEEE Transactions on Multimedia, vol. 5, No. 1, Mar. 2003, pp. 130-140.
Wang et al., "Synchronization Schemes for Controlling VCR-Like User Interactions in Interactive Multimedia-on-Demand (MOD) Systems", The Computer Journal, 2004, vol. 47, No. 2, pp. 140-152.
Unknown Author, "Intel® 815 Digital Set Top Box Block Diagram", printed from http://developer.intel.com/design/celect/refdesign/815dstb/815dstb_refdesign_diagram.thm on Jun. 14, 2005, 16 pgs.
Focus Enhancements, "FS-454 PC-to-Video Scan Converter/Scaler SD and HDTV Outputs", printed from http://www.focusinfo.com/products/fs454/fs454.htm on Jun. 14, 2005, 3 pgs.
Remote Desktop Protocol; Wikipedia; Jun. 20, 2006, 2 pgs.
Use Case Scenarios White Paper; Digital Living Network Alliance; Jun. 2004; 15 pgs.
Overview and Vision White Paper; Digital Living Network Alliance; Jun. 2004; 16 pgs.
Coming Attraction: Intel® Viiv™ Technology; Intel Developer Forum, San Francisco, Moscone West; Aug. 23-25, 2005; 3 pgs.
Bard, "Intel Enables Sharing of Digital Content on the Home Local Area Network"; Home Toys Article; Oct. 2004; 9 pgs.
DLNA Living Network Alliance, "DLNA Overview and Vision Whitepaper", 2006, title page, table of contents, pp. 1-17, copyright page.
Contributing Members of the UPnP™ Forum, "UPnP AV Architecture:0.83", Jun. 12, 2002, title page, table of contents, pp. 1-22.
Contributing Members of the UPnP™ Forum, "UPnP™ Device Architecture 1.0", Dec. 2003, title page, table of contents (2 pgs), pp. 1-73.
Contributing Members of the UPnP™ Forum, "MediaServer V 1.0 and MediaRenderer V 1.0", © 1999-2006, printed Jul. 19, 2006 from http://www.upnp.org/standardizeddcps/mediaserver.asp, 140 pgs.
Contributing Members of the UPnP™ Forum, "RenderingControl:1 Service Template Version 1.01", Jun. 25, 2002, 161 pgs.
Digital Photo Viewer, printed from http://www.tivo.com/1.2.11.asp, 1 pg.
Windows XP Media Center Edition 2005: Features, printed Jul. 5, 2006 from http://www.microsoft.com/windowsxp/mediacenter/evaluation/features.mspx, pp. 1-4.
Show Off Your Photos in Any Room, printed Jul. 5, 2006 from http://www.microsoft.com/windows/windowsmedia/devices/athome/photos.aspx., pp. 1-2.
Windows Media Connect FAQ, printed Jul. 5, 2006 from http:www.microsoft.com/windows/windowsmedia/devices/wmconnect/faq.aspx, pp. 1-20.
Intel® Developer Network for the Digital Home, printed Jul. 15, 2006 from http://www.intel.com/technology/dhdevnet/, pp. 1-2.
Philips Consumer Products, Wireless PC Link, printed Jul. 5, 2006 from http://www.consumer.philips.com/consumer/catalog/concept_more_in..., © 2004-2006, 2 pgs.
Digital Home TV Entertainment Software—CyberLink PowerCinema, printed Jul. 5, 2006 from http://www.cyberlink.com/multi/products/main_12_ENU.html, 2 pgs.
CyberLink PowerCinema 4—The Digital Home Entertainment Center . . . , printed Jul. 5, 2006 from http://www.cyberlink.com/English/products/powercinema/4/pictures.jsp, 2 pgs.
Meedio—Media Center PC and Automation Software for the Digital . . . , printed Jul. 5, 2006 from http://web.archive.org/web/20041104064137/http://www.meedio.com/, 2 pgs.
Meedio—Media Center PC and Automation Software for the Digital . . . , printed Jul. 5, 2006 from http://web.archive.org/web/20040831194829/www.meedio.com/what..., 2 pgs.
Ultimate AV: Digital Home Networking Standard, printed Jul. 5, 2006 from http://ultimateavmag.com/news/11595/..., 2 pgs.
Mediabolic—Entertainment Networking Software, printed Jul. 15, 2006 from http://www.mediabolic.com/products/index.html, 2 pgs.
Mediabolic—Media Player Software, printed Jul. 15, 2006 from http://www.mediabolic.com/products/player.html, 2 pgs.
Mediabolic, "Media Player Software", © 2005, 2006, 2 pgs.
Oregan Networks: Optimised For Television, printed Jul. 15, 2006 from http://www.oregan.net/optimized_for_tv.html, 1 pg.
Oregan Networks: Product Concept, printed Jul. 15, 2006 from http://web.archive.org/web/20041012013205/www.oregan.com/produ..., 1 pg.
Oregan Networks: Digital Media Adaptor, printed Jul. 15, 2006 from http://web.archive.org/web/20041012003419/www.oregan.com/dma.html, 2 pgs.
Oregan Networks—Technology Brief, "Digital Media Connected", 2006, 6 pgs.
Xbox Media Center, "The Project, The XboxMediaCenter Project", printed Jul. 15, 2006 from http://xboxmediacenter.com/info_project.html, 6 pgs.
MythTV, "Features and Screenshots", 2002-2003, printed Jul. 15, 2006 from http://web.archive.org/web/20041020083815/www.mythtv.org/modul..., 4 pgs.
PlayStation.com—PlayStation 2—The Playstation 2, 2006, printed Jul. 15, 2006 from http://www.us.playstation.com/PS2/System..., 2 pgs.
KiSS Technology A/S, printed Jul. 15, 2006 from http://web.archive.org/web/2004014042920/www.kiss-technology.c..., 4 pgs.
Gateway Connected DVD Player Review | PVRblog, printed Jul. 15, 2006 from http://web.archive.org/web/20041123091449/http://www.pvrblog.co..., 52 pgs.
Linksys: Press Releases, printed Jul. 15, 2006 from http://web.archive.org/web/20041117094537/www.linksys.com/press/..., 2 pgs.

* cited by examiner

MEDIA TRANSFER PROTOCOL

CROSS-REFERENCE TO RELATED APPLICATION(S)

This application claims the benefit of U.S. Provisional Application No. 60/642,065, filed Jan. 5, 2005, and is a continuation-in-part of U.S. application Ser. No. 11/198,142, filed on Aug. 4, 2005, the content of both of which are incorporated herein by reference.

This application contains subject matter that is related to the subject matter disclosed in U.S. patent application entitled "System and Method for a Remote User Interface" Ser. No. 11/323,044, and the subject matter disclosed in U.S. patent application entitled "Interactive Multichannel Data Distribution System" Ser. No. 11/322,604, both submitted on the same day as this application, the content of both of which are incorporated herein by reference. This application also contains subject matter that is related to the subject matter disclosed in PCT patent application No. US04/41667 entitled "Multimedia Distribution System," filed on Dec. 8, 2004, the content of which is also incorporated herein by reference.

FIELD OF THE INVENTION

This invention relates generally to data communication protocols, and more specifically, to an improved data communication protocol for transferring different types of digital media to a consumer electronics device.

BACKGROUND OF THE INVENTION

There is an increasing trend in using consumer electronic (CE) devices such as, for example, televisions, portable media players, personal digital assistants (PDAs), and the like, for acquiring, viewing, and managing digital media. Typical digital media may include photos, music, videos, and the like. Consumers want to conveniently enjoy the digital media content with their CE devices regardless of the storage of the media across different devices, and the location of such devices in the home or outside of the home in remote servers.

In a networked environment, digital media may be transferred from one device to another via wired or wireless media transfer protocols. A typical mechanism for transmitting digital media in real-time is over a wired Ethernet connection using a real-time transport protocol (RTP) that typically runs on top of a User Datagram Protocol (UDP). The video and audio data according to this protocol is generally time-stamped and interleaved in a single stream so as to allow a receiving device to play the video and audio in a synchronized manner. It may be desirable at times, however, for a device to transmit the movies, music, pictures, and any other kinds of digital media, in any desired combination, without interleaving them into a single stream, and having the different types of media played at the CE device in real time. For example, a user may want to view pictures with music playing in the background without having the music synchronized with the pictures.

Accordingly, what is needed is a generic media transfer and associated protocol that easily supports the transfer of different types of media independently from each other. The generic media transfer and associated protocol should be flexible enough to allow the media to be streamed and displayed at the CE device without having it synchronized if no synchronization is desired.

SUMMARY OF THE INVENTION

The various embodiments of the present invention are directed to establishing multiple media transfer channels (also referred to as connections) between a computer device and a CE device. The multiple media transfer channels together with an improved media transfer protocol allow for efficient, real-time transfer of different types of digital media, in various combinations, for playing on the CE device. Each type of media is transferred over its own dedicated channel according to its individual data rate. Furthermore, the improved media transfer protocol allows the data to be transmitted in either an asynchronous streaming mode or a timestamp mode depending on whether synchronization is desired.

In addition to the multiple media transfer channels, a dedicated control channel is also established between the media server and the CE device to allow for the transfer of control information, such as, for example, user input information, between the CE device to the media server. The processing of the control information occurs at the media server instead of the CE device. Thus, the CE device may be kept simple, allowing for a cost-efficient CE device.

According to one embodiment, the present invention is directed to a server coupled to a client over a plurality of media transfer channels and transferring different types of media data over the plurality of media transfer channels. The server according to this embodiment includes a media server module and a network transfer module. The media server module identifies a first type of media data for transmitting over a first of the plurality of media transfer channels and a second type of media data for transmitting over a second of the plurality of media transfer channels. The network transport module creates a first media transfer packet including the first type of media data and first timing information and a second media transfer packet including the second type of media data and second timing information. The first and second timing information are used for controlling rendering of the first and second types of media data by the client. The network transport module transmits the first media transfer packet via the first of the plurality of media transfer channels data according to a first data rate and the second media transfer packet via the second of the plurality of media transfer channels according to a second data rate.

According to one embodiment of the invention, the media server module receives control information from the client over a control channel, processes the control information, and identifies particular media in response. The network transport module transmits the particular media over at least one of the plurality of media transfer channels.

According to one embodiment of the invention, the first of the plurality of media transfer channels is a video channel, and the first type of media data is video data. The video data may be for a user interface video prompting user interactions with the client.

According to one embodiment of the invention, the first timing information indicates that the first type of media data is streaming data for rendering immediately by the client asynchronously from the second type of media data.

According to one embodiment of the invention, the first timing information indicates that the first type of media data is synchronous stream data for rendering by the client according to an indicated timestamp. The first timing information further includes a duration value, wherein rendering of the second type of media data is paused responsive to a determination that a media timer exceeds a last received timestamp plus its associated duration value.

According to one embodiment of the invention, the second of the plurality of media transfer channels is an audio channel, and the second type of media data is audio data.

According to one embodiment of the invention, the second timing information indicates that the second type of media data is asynchronous stream data for rendering immediately by the client asynchronously from the first type of media data.

According to one embodiment of the invention, the second timing information indicates that the second type of media data is synchronous stream data for rendering by the client according to an indicated timestamp, the first timing information further including a duration value, wherein rendering of the first type of media data is paused responsive to a determination that a media timer exceeds a last received timestamp plus its associated duration value.

According to one embodiment of the invention, the second of the plurality of media transfer channels is an overlay channel, the second type of media data is overlay data, and the second timing information indicates that the second type of media data is asynchronous streaming data for rendering immediately by the client asynchronously from the first type of media data.

According to one embodiment of the invention, the second of the plurality of media transfer channels is an overlay channel, the second type of media data is subtitle data, and the second timing information indicates that the second type of media data is synchronous timestamped data for rendering by the client synchronously with the first type of media data according to an indicated timestamp.

According to one embodiment of the invention, the media server module identifies a third type of media data for transmitting over a third of the plurality of media transfer channels and the network transport module creates a third media transfer packet including the third type of media data and third timing information. The third timing information controls rendering of the third type of media data by the client. The network transport module transmits the third media transfer packet via the third of the plurality of media transfer channels according to a third rate.

According to one embodiment of the invention, the first, second, and third of the plurality of media transfer channels are respectively video, audio, and overlay channels, and the first, second, and third types of media data are respectively video, audio, and overlay data.

According to one embodiment of the invention, the first and second timing information indicates that the video and audio data are synchronous streaming data for rendering by the client according to an indicated timestamp. The first and second timing information further includes first and second duration values, and the rendering of the video or audio data is paused responsive to a determination that a media timer exceeds a last received timestamp for the corresponding media plus its associated duration value. The third timing information according to this embodiment indicates that the overlay data is synchronous timestamped data for rendering by the client synchronously with the video and audio data according to an indicated timestamp.

According to another embodiment of the invention, the first, second, and third timing information indicates that the first, second, and third media data are asynchronous streaming data for rendering immediately by the client asynchronously from other types of media data.

According to one embodiment of the invention, the first of the plurality of media transfer channels is an audio channel, the first type of media data is audio data, the second of the plurality of media transfer channels is an overlay channel, and the second type of media data is overlay data.

According to another embodiment, the present invention is directed to a server coupled to a client over a plurality of media transfer channels and transferring different types of media data over the plurality of media transfer channels. The server according to this embodiment includes a data store storing a plurality of media files, a media server coupled to the data store, a demultiplexer module coupled to the media server module, and a network transport module. The media server module identifies and retrieves a particular media file from the data store. The demultiplexer module parses the particular media file and separates a plurality of different types of media data included in the media file. The network transport module transmits each separated type of media data over a separate one of the plurality of media transfer channels.

According to one embodiment of the invention, the media server module receives a change in play mode over a control channel, processes the change in play mode, and transmits a resynchronization packet for resynchronizing a media position of the server.

According to one embodiment of the invention, the media file is a movie file, and the demultiplexer module separates video and audio data included in the movie file.

According to one embodiment of the invention, the network transport module transmits the video data over a dedicated video channel, and the audio data over a dedicated audio channel.

According to one embodiment of the invention, the network transport module creates a video transfer packet including the separated video data and video timing information, and an audio transfer packet including the separated audio data and audio timing information. The video and audio timing information are used for controlling rendering of the separated video and audio data by the client.

According to one embodiment of the invention, the video and audio timing information indicates that the separated video and audio data is synchronous stream data for rendering by the client according to an indicated timestamp, the video and audio timing information each further including a duration value, wherein rendering of the video or audio data is paused responsive to a determination that a media timer exceeds a last received timestamp for the corresponding media plus its associated duration value.

According to one embodiment of the invention, the demultiplexer module further separates subtitle data included in the movie file. The network transport module transmits the subtitle data over a dedicated subtitle channel.

According to one embodiment of the invention, the video transfer packet includes the separate subtitle data and subtitle timing information, the subtitle timing information for controlling rendering of the subtitle data by the client, the subtitle timing information for indicating that the subtitle data is synchronous timestamped data for rendering by the client synchronously with the video and audio data according to an indicated timestamp.

According to a further embodiment, the present invention is directed to a server coupled to a client over a plurality of media transfer channels and transferring different types of media data over the plurality of media transfer channels. The server according to this embodiment includes a data store storing a plurality of media files, a media server module coupled to the data store, and a network transport module. The media server module receives a request to playback a particular media file, and identifies the particular media file as a file having a file type unsupported by the server. The network transport module receives from the client a particular range of data included in the particular media file, creates a media transfer packet including the requested range of data, and transmits the media transfer packet over one of the plurality of media transfer channels, the one of the plurality of media transfer channels being dedicated for transmitting media files having unsupported file types.

According to one embodiment of the invention, the plurality of media transfer channels further include dedicated video, audio, and overlay channels, wherein the network transport module blocks usage of the video, audio, and overlay channels during the transfer of the particular media file.

These and other features, aspects and advantages of the present invention will be more fully understood when considered with respect to the following detailed description and accompanying drawings.

DETAILED DESCRIPTION

In general terms, the various embodiments of the present invention are directed to establishing multiple media transfer channels (also referred to as connections) between a computer device and a CE device. The multiple media transfer channels together with an improved media transfer protocol allow for efficient, real-time transfer of different types of digital media, in various combinations, for playing on the CE device. Each type of media is transferred over its own dedicated channel according to its own individual data rate. Furthermore, the improved media transfer protocol allows the data to be transmitted in either a streaming mode or a timestamp mode depending on whether synchronization is desired.

In addition to the multiple media transfer channels, a dedicated control channel is also established between the media server and the CE device to allow for the transfer of control information, such as, for example, user input information, from the CE device to the media server. The processing of the control information occurs at the media server instead of the CE device. Thus, the CE device may be kept simple, allowing for a cost-efficient CE device.

Figure 1:
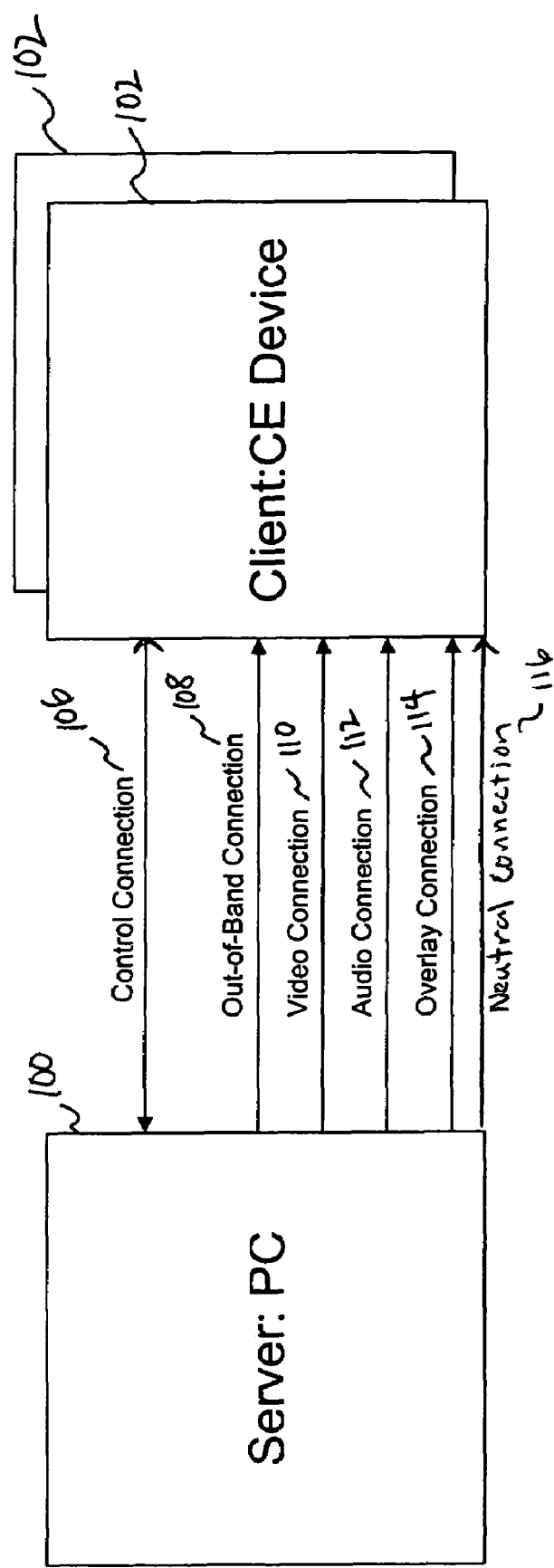
FIG. 1 is a schematic block diagram of various data communication connections that may be established between a media server and a client according to one embodiment of the invention.

FIG. 1 is a schematic block diagram of various data communication connections that may be established between a media server 100 (such as a PC) and a client 102 (such as a CE device) according to one embodiment of the invention. The connections may be wired connections such as, for example, Ethernet connections, wireless connections such as, for example, 802.11a, 802.11b, or 802.11g wireless local area network connections, or any wired or wireless wide area network connection conventional in the art.

The various data communication connections adhere to an improved media transfer protocol which, according to one embodiment of the invention, is an extension of the conventional RTP. The improved media transfer protocol runs on top of a transfer layer protocol such as, for example, a transmission control protocol (TCP). Although TCP is used as an example, a person of skill in the art should recognize that other transfer layer protocols may also be utilized, such as, for example, UDP.

In the illustrated embodiment, a control channel 106 is established for use by the client 102 to send control information to the server 100. The control channel 106 may also be used instead of a dedicated out-of-band channel 108. Information transmitted over the control channel may be cryptographically processed utilizing any one of various encryption and/or authentication mechanisms known in the art. Such cryptographic processing helps prevent unauthorized CE devices from receiving media and other related information and services from the media server.

An exemplary control information is a button/key press information generated via a user input device. All control information, including the exemplary button/key press information, is transmitted to the server and processed by the server instead of the client itself. The offloading of such processing requirements to the server allows for a thin client without compromising the user interface provided to the end user.

The multiple media transfer channels established between the server 100 and client 102 include, but are not limited to, an out-of-band channel 108, a video channel 110, and audio channel 112, an overlay channel 114, and a neutral channel 116. The out-of-band channel 108 is used to exchange data for re-synchronizing the media position of the server in response to trick play manipulations such as, for example, fast forward, rewind, pause, and jump manipulations by a user of the client CE device. The out-of-band channel 108 may also be used for sending pause-unpause packets and/or time update packets to the client. According to another embodiment of the invention, no separate out-of-band channel is provided. Instead, all packets that would have been transmitted and/or received over the out-of-band channel are transmitted and/or received over the control channel.

The dedicated video, audio, and overlay channels 110, 112, 114 are respectively used for transmitting compressed video, audio, and image overlay data from the server 100 to the client 102. The neutral channel 116 is used for transmitting to the client 102, files having file types that are natively supported by the client but not the server (hereinafter referred to as neutral media files), for playback by the client.

Figure 2:
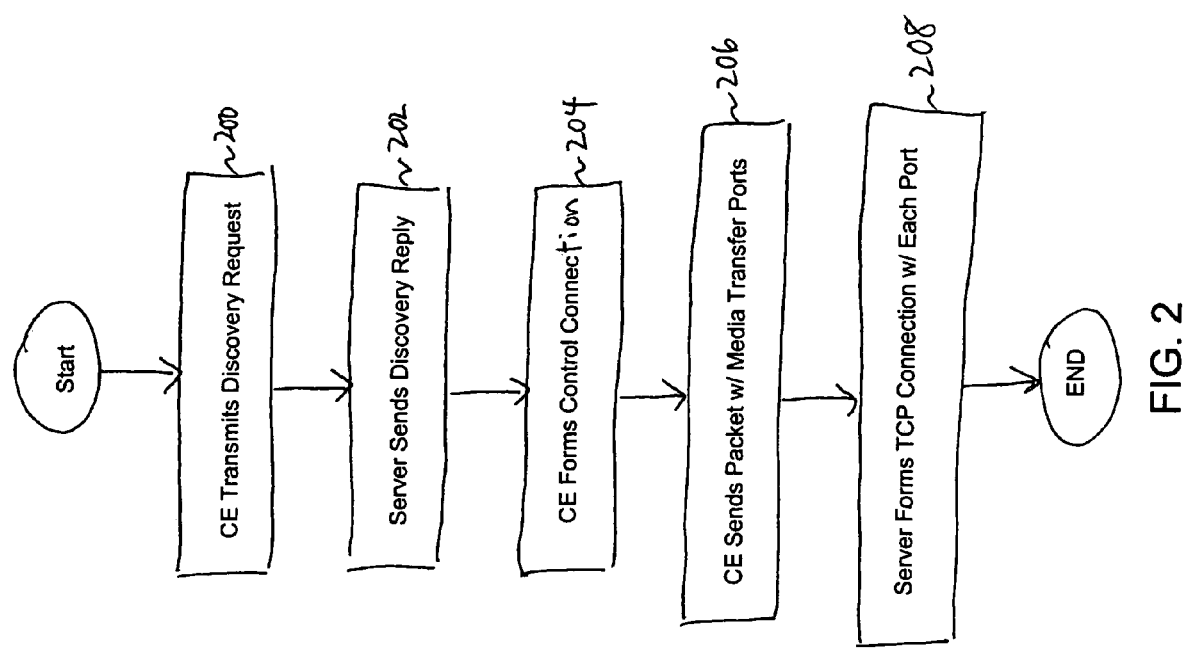
FIG. 2 is a flow diagram of a process for establishing a connection between the server and client of FIG. 1 according to one embodiment of the invention.

FIG. 2 is a flow diagram of a process for establishing a connection between the server 100 and the client 102 according to one embodiment of the invention. In step 200, the client 102 transmits a discovery request over a predefined port. According to one embodiment of the invention, the discovery request is a broadcast UDP packet with a header portion containing information on an IP address of the client as well as information on a port that the server may use to respond to the discovery request.

In step 202, an available server receiving the discovery request responds with a discovery reply. According to one embodiment of the invention, the discovery reply is a UDP packet which includes information of a control port that the client may use to establish the connection.

In step 204, the client receives the discovery reply and establishes a TCP connection, such as, for example, the control connection 106, over the indicated control port. In step 206, the client sends over the control connection 106 a packet containing information about the available media transfer ports. In step 208, the server establishes a TCP connection to each indicated media transfer port. For example, the out-of-band connection 108 may be established with a first indicated port, video connection 110 over a second indicated port, audio connection 112 over a third indicated port, the overlay connection 114 over a fourth indicated port, and the neutral connection 116 over a sixth indicated port. A person of skill in the art should recognize that the present embodiments are not limited to the illustrated media transfer connections, and other media transfer connections may also be established as needed for facilitating the transfer of information between the server and client.

Figure 3:
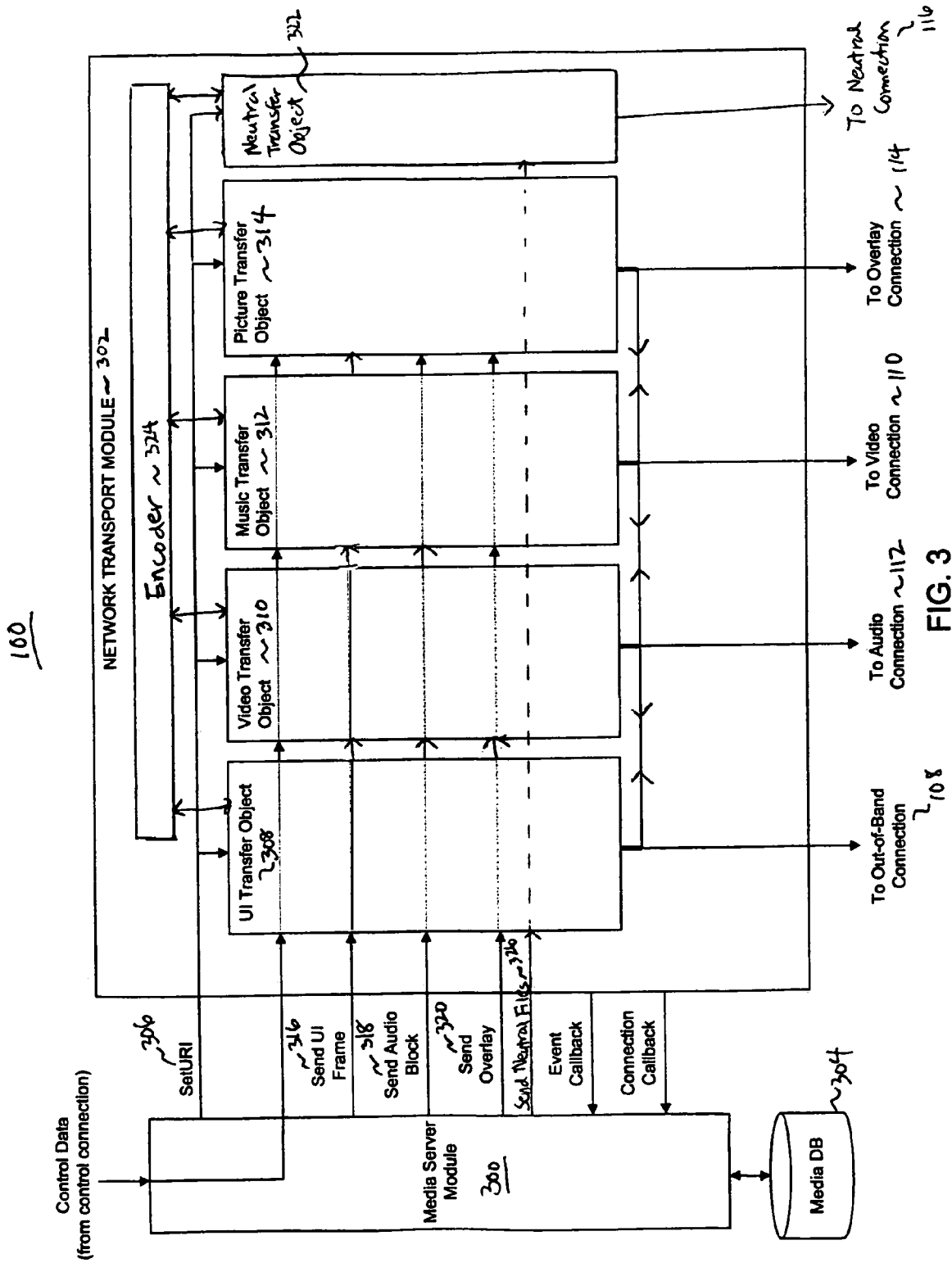
FIG. 3 is a more detailed block diagram of the media server of FIG. 1 according to one embodiment of the invention.

FIG. 3 is a more detailed block diagram of the media server 100 according to one embodiment of the invention. In addition to a PC, the media server may take the form of any networked device having a processor and associated memory for running a media server program. Thus, the media server 100 may be a laptop computer, set-top box, digital video recorder, stereo or home theater system, broadcast tuner, video or image capture device (e.g. a camera or camcorder), multimedia mobile phone, and the like.

According to one embodiment of the invention, the media server 100 includes a media server module 300 in communication with a network transport module 302 and a media database 304. The media server and network transport modules 300, 302 may be software modules implemented via one or more processors executing computer program instructions stored in memory. The media server module 300 may interface with the network transport module over an application program interface (API).

The media server module 300 receives control packets from the client and in response, determines the particular media that is to be transferred to the client. The media may be a movie, a user interface (UI), music, pictures, and the like, at least some of which are stored in the media database 304. In order to transmit the media to the client, the media server module 300 issues to the network transport module 302, a command 306 to generate an appropriate media transfer object. According to one embodiment of the invention, the command 306 includes the media type and a path to the media that is to be transferred. The path to the media may be identified by a uniform resource identifier (URI).

In response to the command 306, the network transport module 302 creates a media transfer object such as, for example, a UI transfer object 308, video transfer object 310, music transfer object 312, picture transfer object 314, or neutral transfer object 322. Media data is then sent to the appropriate media transfer object using appropriate API commands. For example, a UI frame may be sent via a "send UI frame" command 316, an audio block may be sent using a "send audio block" command 318, an image overlay may be sent using a "send overlay" command 320, or a neutral file may be send using a "send neutral command 326.

According to one embodiment of the invention, the network transport module 302 includes encoding capabilities provided by one or more encoders 324, such as, for example, a video encoder, for generating appropriate media chunks as is described in further detail in the above-referenced PCT patent application No. US04/41667.

The generated media transfer block receives the media data and generates appropriate media data packets in response. In doing so, the media transfer block generates and attaches the appropriate headers including appropriate timing data to the media data packets according to the improved media transfer protocol. The media data packets are then transmitted over the appropriate media transfer channels 108-116.

Figure 4:
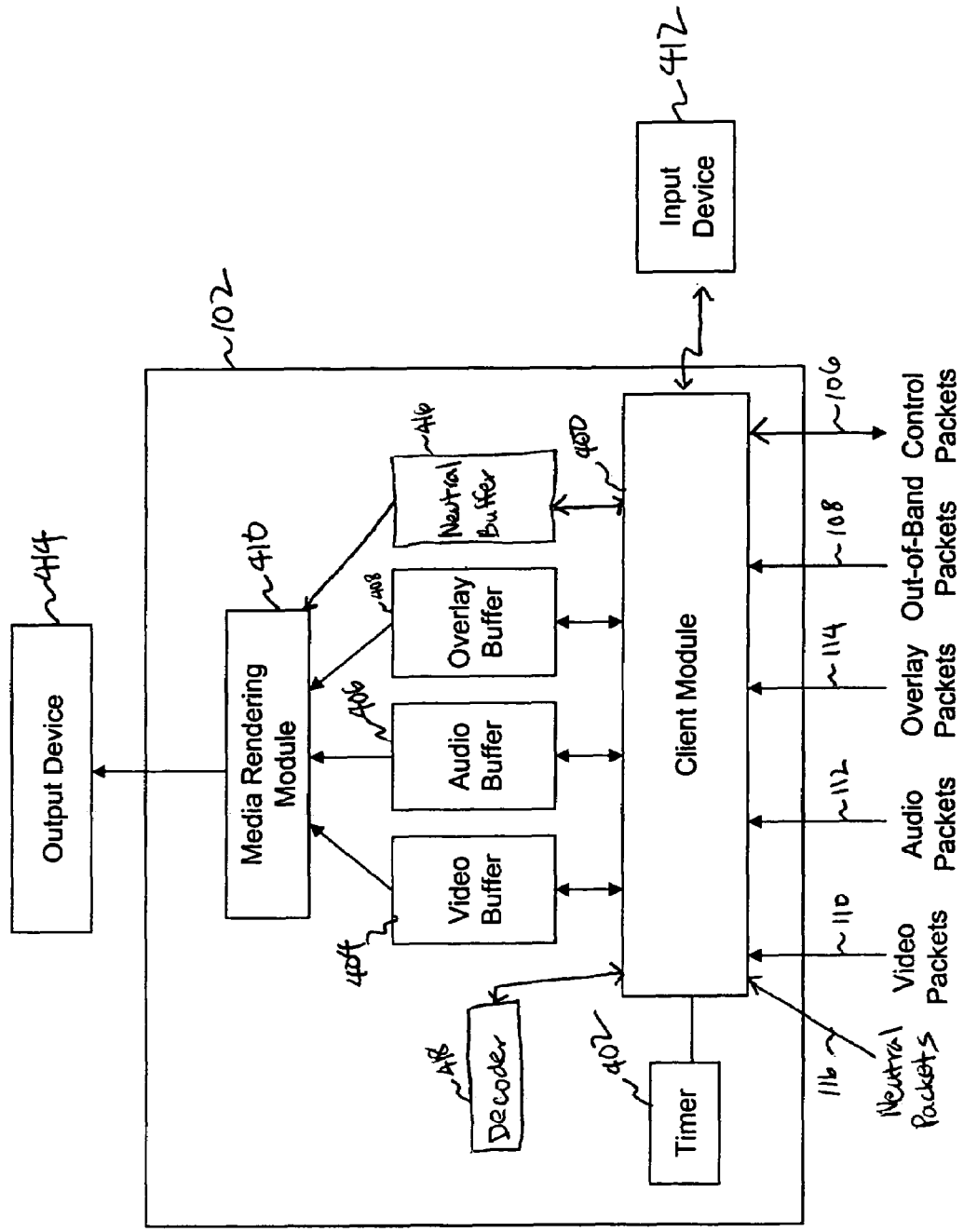
FIG. 4 is a more detailed block diagram of the client of FIG. 1 according to one embodiment of the invention.

FIG. 4 is a more detailed block diagram of the client 102 receiving the media data packets according to one embodiment of the invention. The client 102 may take the form of any networked CE device configured with the necessary peripherals, hardware, and software for accepting user input data and rendering audio, video, and overlay images. Exemplary CE devices include, but are not limited to, TV monitors, DVD players, PDAs, portable media players, multimedia mobile phones, wireless monitors, game consoles, digital media adaptors, and the like.

According to one embodiment of the invention, the client 102 includes a client module 400 configured to receive video packets transmitted over the video channel 110, audio packets transmitted over the audio channel 112, video overlay packets transmitted over the overlay channel 114, neutral file packets transmitted over the neutral channel 116, and resynchronization and other out-of-band packets transmitted over the out-of-band channel 108 or control channel 106. The client module 400 may be implemented via any mechanism conventional in the art, such as, for example, as a software module executed by a microprocessor unit hosted by the client 102.

The client also includes a decoder 418 for decoding and uncompressing encoded packets such as, for example, encoded video packets, and a media rendering module 410 configured to render the decoded packets on an output device 414. The output device 414 may include one or more displays and/or speakers. Together, the media rendering module 410 and the output device 414 may be referred to as a media player. The media player may be incorporated into the client 102, or reside as a separate media player in communication with the client 102.

The client module 400 forwards the received packets to their respective buffers. According to one embodiment of the invention, the client 102 maintains separate fixed-size buffers for the various media transfer channels. For example, the client 102 maintains a video buffer 404 for the video channel 110, an audio buffer 406 for the audio channel 112, an overlay buffer 408 for the overlay channel 114, and a neutral buffer 416 for the neutral channel 116. According to another embodiment of the invention, instead of maintaining a separate neutral buffer, one or more of the video, audio, and/or overlay buffers may be used for storing neutral data packets.

Each buffer is emptied at a rate in which the media rendering module 410 renders the data stored in the particular buffer to the output device 414. If a packet is a stream packet, the data is rendered by the media player as soon as its rendering is possible. If a packet is a time-stamped packet, the data is rendered after the passage of the time specified in the timestamp, as is measured by a media timer 402 coupled to the client module 400.

According to another embodiment of the invention, the packets are loaded into a queue if the packet is delivered in a stream mode. The queue is a hardware device that is automatically started once the first packet's timestamp is less than or equal to the internal timer. The timestamp should be set to zero if the packet's payload is to be played as soon as possible. According to this embodiment, the queue plays through the bitstream without looking at timestamps. The queue only pauses when starvation of a media channel is detected.

User input selections are provided to the client 102 via a user input device 412 coupled to the client over wired or wireless mechanisms. According to one embodiment of the invention, the input device includes keys (also referred to as buttons) which may be manipulated by a user to invoke particular functionalities associated with the keys. The input device may be a remote controller or another input device conventional in the art, such as, for example, a mouse, joystick, sensor, or voice input device.

User input selections are packaged as control packets and transferred to the server 100 over the control channel 106 for processing by the server.

Figure 5:
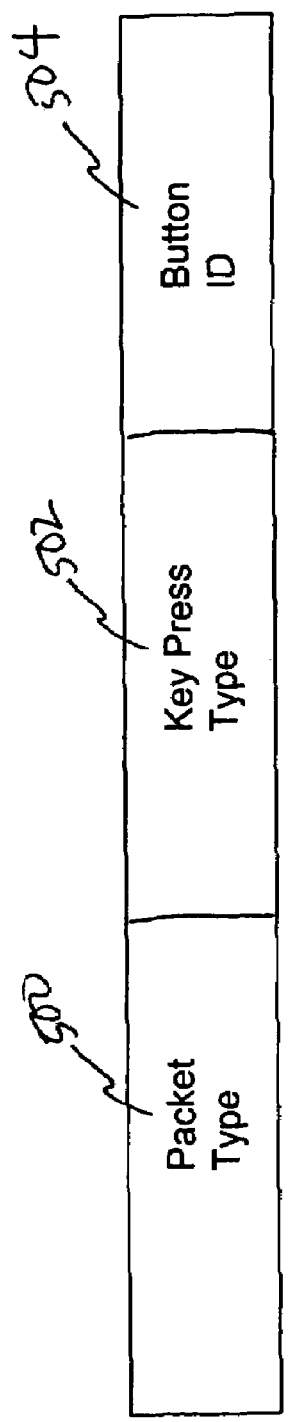
FIG. 5 is an exemplary block diagram of a control packet generated according to an improved media transfer protocol according to one embodiment of the invention.

FIG. 5 is an exemplary block diagram of an exemplary control packet generated according to the improved media transfer protocol according to one embodiment of the invention. The control packet includes a packet type field 500 indicating the type of control information that is being transmitted. For example, the type field 500 may indicate that it is a keypress packet. Keypress packets include a keypress type field 502 and a button identifier field 504. The keypress type field 502 indicates a button's current state, such as, for example, that the button is in a down, pressed position, or that the button is in an up, unpressed position. The button ID field identifies a particular button that is invoked on the user input device 412, such as, for example, a left, right, select, play, stop, rewind, fast forward, jump, or pause button.

Another exemplary control packet that may be transmitted by the client 102 to the server 100 is a position packet. According to one embodiment of the invention, the client transmits to the server the position packet at certain time intervals, such as, for example, every five seconds. The position packet includes a current media time of the media that is currently being played by the client. This information may be useful for the server, for example, in generating and transmitting visual information of a current location of the media file that is being played. Alternatively, the position packet may be transmitted as an out-of-band data packet via the out-of-band channel 108.

Figure 6:
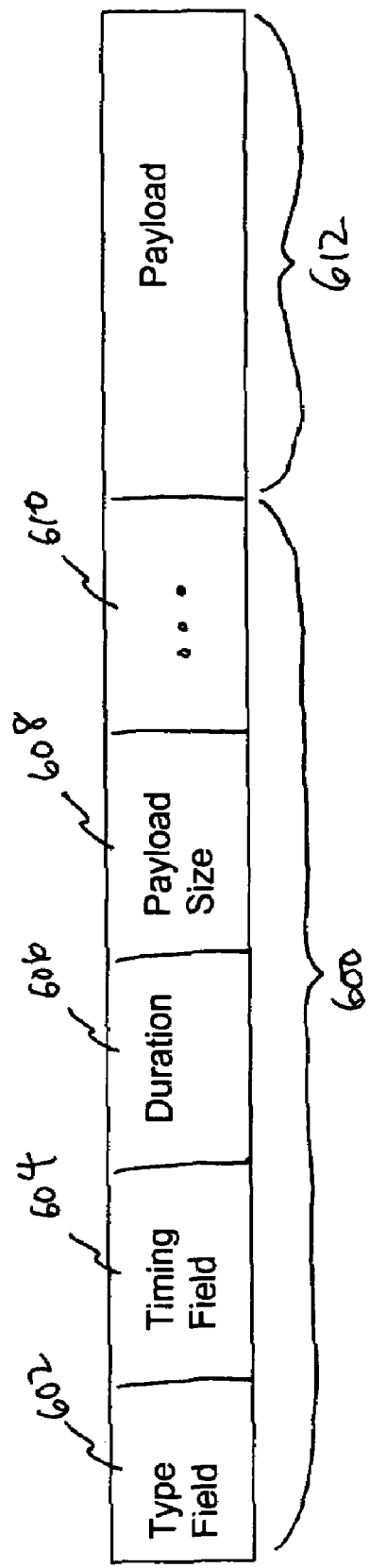
FIG. 6 is an exemplary block diagram of a packet generated according to an improved media transfer protocol according to one embodiment of the invention.

FIG. 6 is an exemplary block diagram of a data packet generated by the server 100 according to the improved media transfer protocol according to one embodiment of the invention. The generated data packet is transmitted over an appropriate media transfer channel for rendering by the client 102.

The data packet includes a header portion 600 with a type field 602, timing field 604, duration 606, and payload size 608. Any other conventional fields 610 that may be contained in a typical RTP packet header may also be included in the header portion 600 of the data packet. The actual payload data for the media to be transmitted over the media connection is included in a payload portion 612 of the packet.

The type field 602 indicates the type of media that is being transmitted, such as, for example, a particular type of video (e.g. DivX, AVI, etc.), a particular type of audio (e.g. MP3, AC3, PCM, etc.), or a particular type of image (e.g. JPEG, BMP, etc.). The type field 602 may also be used to indicate that the media file that is being transmitted is a neutral media file.

The timing field 604 indicates how media is to be rendered by the client 102. According to one embodiment, of the invention, the timing field may indicate a synchronous stream mode, a synchronous timestamp mode, or an asynchronous mode. A packet transmitted in the synchronous stream mode (also referred to as "sync exact") indicates that the packet should not be played until an indicated timestamp. The packet further sets a duration value in the duration field 606. The duration value indicates a duration of time in which the transmitted data is valid. The duration value thus allows the client device to compare a current media position to the timer 402 value to keep them matched at all times. If the media runs out of data, the timer is configured to pause. The client device knows if it ran out of data by comparing the timestamp plus duration value of the last received packet to the timer value. If the timer value is greater, then the data has run out, and the timer is paused. If the timer is paused, then the media playback pauses as well. Types of data that are to be delivered in a continuous stream and that require synchronization with the media timer, such as, for example, movie video and audio data, are delivered in the synchronous stream mode.

A packet that is transmitted in the synchronous timestamp mode is synchronized via timestamps. The duration field is not used in this mode for synchronization. An exemplary type of data that is transmitted in the synchronous timestamp mode is subtitle data. For subtitle data, there is no continuous stream of the data, but there is an appropriate time for the data to be rendered. Such rendering time is specified by an accompanying timestamp. If the data packet arrives late, however, the timer 402 remains unaltered. If the data arrives early, it is stored until the time it should be played back.

The asynchronous mode is a streaming mode independent of timestamps or durations. Once a data chunk arrives in this mode, the client device renders the data as soon as possible. One exception is if a sync-to-video flag is set, such as, for example, in the UI mode. In this case, the data chunk is configured to be buffered until the corresponding video frame is played. This allows some level of audio-visual synchronization in the UI mode.

According to one embodiment of the invention, the timing and duration fields 604, 606 are ignored for transporting neutral media files because the media server 100 does not parse those files for determining their timing.

Other fields 610 specific to the particular type of media being transmitted may also be included in the header portion 600 of the packet. For example, if the packet is a video packet, information such as the video dimensions may be included in the packet. Similarly, if the packet is an audio packet, information such as the sample rate may be included in the packet.

Referring again to the timing field 604, provided is an example of how this field may be used to control the rendering of a movie by the client. For the transfer of movies, the video portion of the movie is transmitted over the video channel 110 and the audio portion transmitted over the audio channel 112. According to this example, all video and audio packets are transmitted in a synchronous stream mode.

Each video and audio packet includes a time duration in the duration field 606. If the client 102 detects during the rendering of a video or an audio packet that its associated time duration has expired without receiving another video or audio packet, respectively, the timer 402 controlling the rendering of the audio or video data, respectively, is stopped. This results in no further video packets being displayed when there is a lag in the audio packets, and nor further audio packets being played when there is a lag in the video packets. Such a lag could be encountered, for example, when there is congestion in the video or audio channel. When the next awaited packet does in fact arrive, the timer is restarted to continue the rendering of both the video and audio packets in a manner that is synchronized with the timer 402.

In addition to the transfer of movies, the above architecture also allows the concurrent transfer of other types of media over the multiple media transfer connections. For example, the server 100 may transmit a slide show over the video channel 110 and background music over the audio channel 112. Since synchronization of these two types of media is not needed, both the video and audio packets may be transmitted in an asynchronous mode, allowing the client to process each type of media as soon as possible, without dealing with fine synchronization issues.

According to another example, the server 100 generates and transmits UI frames as video over the video channel 110. In this regard, the server generates a graphical image of a remote UI and invokes the encoder 324 for transforming the graphical UI into a compressed video format. The video of the remote UI is then transmitted to the client 102 in an asynchronous mode over the video channel for display on the client. Other types of media such as, for example, overlay and/or audio data, may also be concurrently streamed over the overlay and/or audio channels 114, 112.

The client 102 receives the UI video, decodes it via the decoder 418, and displays it as it would display any other type of video. The client need not be aware that the video provides a UI. A user of the client 102 interacts with the UI via the input device 412. All key and button events generated during the interaction are packaged into control packets and transmitted to the server 100 over the control connection 106. The server 100 updates the graphical image of the UI based on the user input as needed, transforms the updated UI into a compressed video frame, and streams the video to the client 102 for display thereon. A very rich UI display may therefore be generated even with a simple client since the rendering and processing functions are offloaded to the server. Details on the remote UI are described in further detail in the above-referenced application submitted on the same day as this application entitled "System and Method for a Remote User Interface."

Figure 7A:
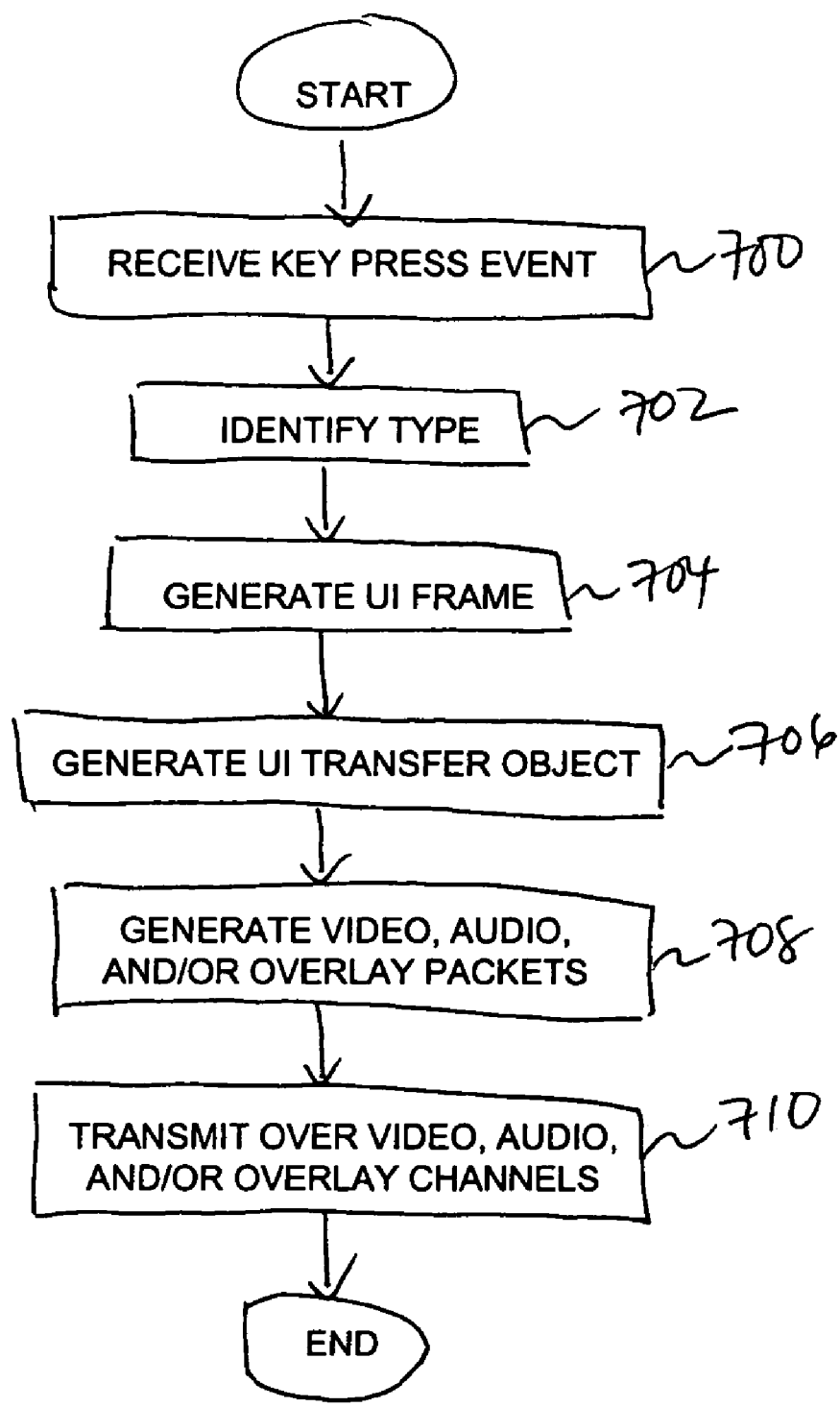
FIGS. 7A and 7B are respectively a flow diagram and a schematic block diagram illustrating the generating and/or updating of a remote UI displayed on the client of FIG. 1 according to one embodiment of the invention.
Figure 7B:
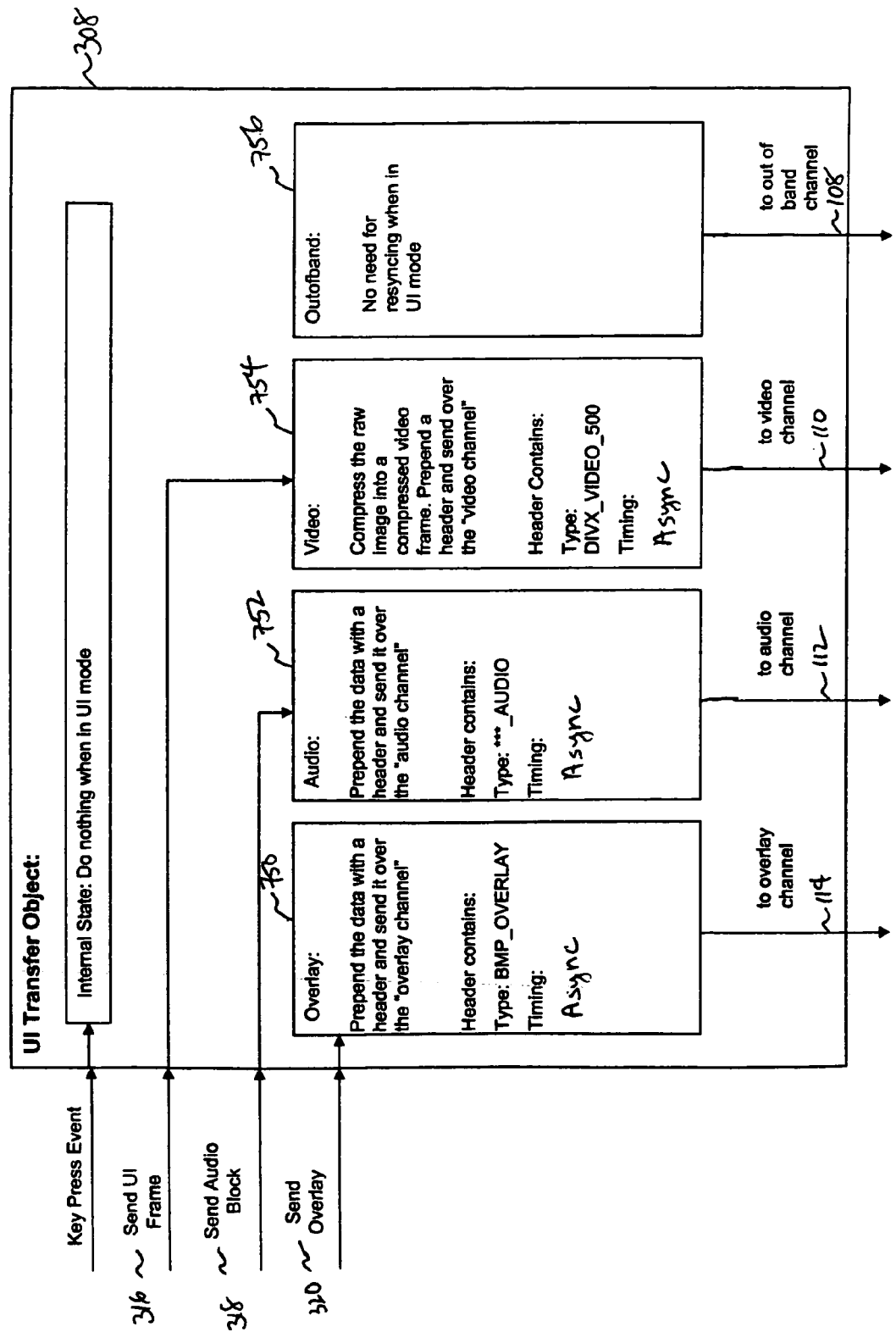

FIGS. 7A and 7B are respectively a flow diagram and a schematic block diagram illustrating the generating and/or updating of a remote UI displayed on the client 102 according to one embodiment of the invention. In step 700, the media server module 300 receives a control packet including a key press event. In step 702, the media server module identifies the type of key press event based on information contained in the key press type field 502 and button ID field 504 of the received control packet. In step 704, the media server module 300 generates or updates a frame of the remote UI in response to the identified key press event, and stores the UI frame in a frame buffer (not shown).

In step 706, the media server module 300 transmits to the network transport module 302 a command 306 to generate a UI transfer object. The command 306 indicates that the type of media to be transferred is a UI frame, and further includes a reference to the UI image buffer that is to be transferred. In response, the network transport module 302 generates the UI transfer object 308 in step 706.

In step 708, the UI transfer object 308 generates the appropriate video, audio, and/or overlay packets 754, 752, 750 (FIG. 7B) to be transmitted to the client 102, and transmits the packets over their respective media transfer channels 108-114 in step 710. In generating the video packet 754, the UI transfer block 308 takes a UI frame transmitted by the media server module 300 using the appropriate API command 316, and compresses the raw UI image into a compressed video frame such as, for example, a DivX video frame. The UI transfer block 308 then determines and prepends the appropriate header data into the header portion 600 of the generated data packet. In doing so, the type field 602 of the data packet is set to an appropriate video type, and the timing field 604 is set to an appropriate timing mode. According to one embodiment of the invention, because the packet is for transmitting UI video, the UI transfer block sets the timing field to an asynchronous mode. In this manner, the UI video packet may be rendered by the client 102 immediately upon its receipt without worrying about synchronization issues. According to another embodiment of the invention, the sync-to-video flag is set for the UI video packet to indicate to the client that the packet is to be buffered until the corresponding video frame is played.

Audio and/or overlay packets 752, 750 are also generated by the UI transfer block 308 in the presence of audio and/or overlay data transmitted by the media server module 300 via their respective API commands 318, 320. Audio packets may be associated, for example, with background music to be played along with the UI display. Overlay packets may be associated, for example, with status bars, navigation icons, and other visuals which are to be overlaid on top of the UI video.

In generating the audio and/or overlay packets, the UI transfer block 308 takes an audio block and/or overlay data transmitted by the media server module 300 using the appropriate API commands 318, 320. According to one embodiment of the invention, the audio block contains compressed audio data. The UI transfer block further determines and prepends the appropriate header data into the header portions 600 of the generated data packets. In doing so, the UI transfer block sets the type field 602 of the audio data packet to an appropriate audio type, and further sets the type field of the overlay data packet to an appropriate image type. Furthermore, the UI transfer block sets the timing fields 604 of both the audio and overlay packets to an asynchronous mode. Thus, the audio and/or overlay packets may be rendered by the client 102 immediately upon their receipt, without having to synchronize them with the UI video.

Figure 8A:
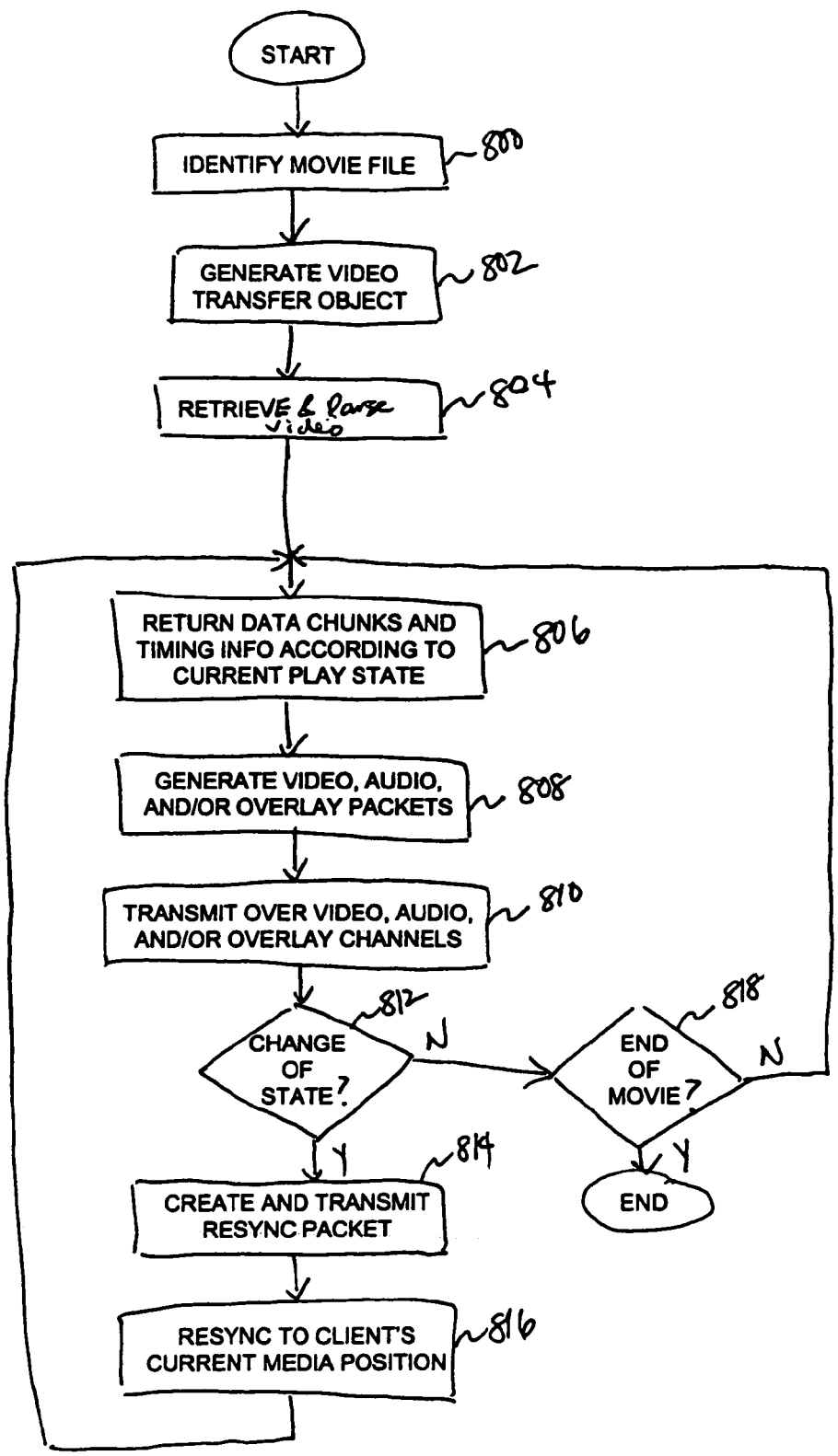
FIGS. 8A-8B are respectively a flow diagram and a schematic block diagram illustrating the transfer of a movie utilizing the multiple media connections and improved media transfer protocol according to one embodiment of the invention.
Figure 8B:
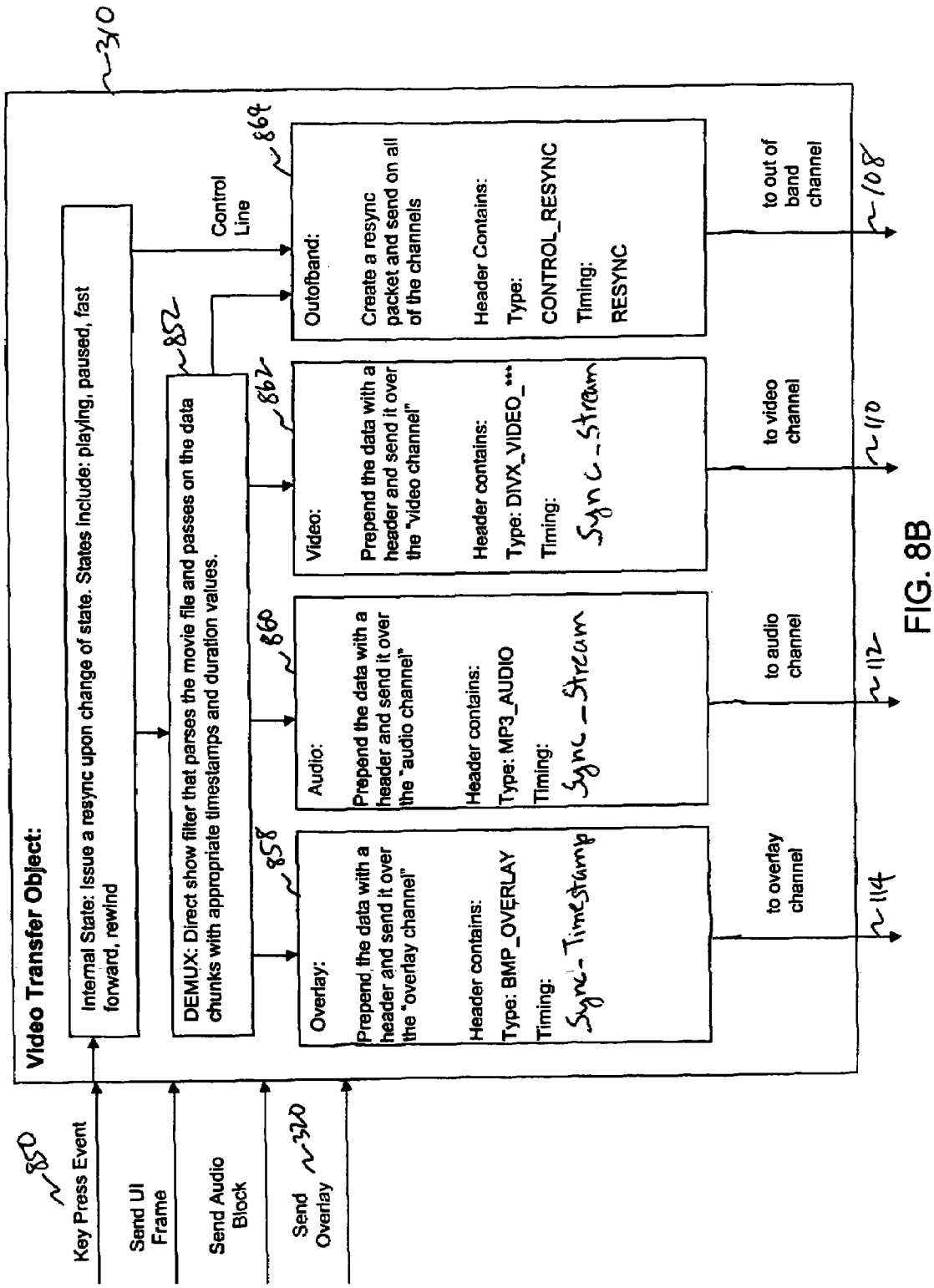

FIGS. 8A-8B are respectively a flow diagram and a schematic block diagram illustrating the transfer of a movie utilizing the multiple media connections and improved media transfer protocol according to one embodiment of the invention. In step 800, the media server module 300 identifies an appropriate movie file from the media database 304 that is to be transferred based on a current user selection. The media server module 300 then transmits to the network transport module 302 a command 306 to generate a video transfer object. The command 306 indicates that the type of media to be transferred is a movie, and further includes a path to the movie that is to be transferred. In response, the network transport module 302 generates the video transfer object 310 in step 802. In step 804, a demultiplexer module 852 (FIG. 8B) takes as input the path to the movie, parses the movie, and generates, in association with the encoder 324, appropriate data chunks in response, such as, for example, video chunks, audio chunks, and the like.

For example, as described in further detail in the above-referenced PCT application No. US04/41667, the process of creating video chunks can involve decoding the video source and encoding the decoded video into video chunks that include compressed bitstreams of the video. Each video chunk contains information for a single frame of video. The process of creating audio chunks can involve decoding the audio source and encoding the decoded audio into audio chunks that include compressed bitstreams of the audio. The decoding process simply involves taking video and audio in a particular format and decoding the video and audio from that format into a standard video and audio format, which may be uncompressed.

The demultiplexer module 852 may include, for example, a filter which is invoked to parse the movie. During the parsing process, the filter separates the individual types of media streams included in the movie, such as, for example, video, audio, and/or overlay streams. According to one embodiment of the invention, the movie may include one or more UI video streams for providing DVD-like menuing capabilities to a viewer of the particular movie. The creation of movie files including such UI video streams is discussed in further detail in the above-referenced PCT patent application entitled "Multimedia Distribution System."

Data chunks for each type of media stream are returned by the demultiplexer module 852 in step 806 along with their corresponding timestamps and duration values. In step 808, the video transfer object generates the appropriate video, audio, and/or overlay packets 862, 860, 858 (FIG. 8B) based on the received data chunks, timestamps, and duration information. The packets are then transmitted in step 810 over their appropriate media transfer channels 108-114. According to one embodiment of the invention, if the video transfer object receives API commands from the media server module 300 to send separate image, audio, or overlay data, an error is returned.

In generating the video packet 862 for a received video data chunk, the video transfer object 310 prepends the appropriate header data into the header portion 600 of the video packet. In doing so, the type field 602 of the video packet is set to an appropriate video type, and the timing field 604 is set to an appropriate timing mode. According to one embodiment of the invention, the timing field for the video packet is set to indicate a synchronous stream mode.

Furthermore, in generating the audio packet 860 for a received audio data chunk, the video transfer object 310 prepends the appropriate header data into the header portion 600 of the audio packet. In doing so, the type field 602 of the data packet is set to an appropriate audio type, and the timing field 604 is set to an appropriate timing mode. According to one embodiment of the invention, the timing field of the audio packet is set to indicate a synchronous stream mode.

Overlay packets 858 are also generated by the video transfer block 310 if overlay data is transmitted by the demultiplexer module 856. Overlay packets may include, for example, subtitles that may be displayed along with the video.

In generating the overlay packet, the video transfer block 310 takes the overlay data and prepends the appropriate header data into the header portion 600 of the generated overlay packet. The type field 602 of the overlay packet is set to an appropriate image type, and the timing field 604 is set to synchronous timestamp mode to allow synchronization with the video and audio portions of the movie.

According to one embodiment of the invention, the current play state may change in response to a key press event 850 (FIG. 8B) transmitted over the control connection 106. For example, the play state may change from a normal play mode to a fast forward mode, rewind mode, or pause mode. In this regard, the video transfer object 310 determines, in step 812, whether a change of state has occurred based on the received key press event 850. If no change of state is detected, data packets are transmitted in the current play state until the end of the movie as is determined in step 818.

Upon the detection of a change of play state, the video transfer object 310 creates and transmits, in step 814, a resynchronization packet 864 over the out-of-band channel 108 (or control channel 106). The resynchronization packet may identify particular data packets to be flushed out by the client, or specify a media time if the server desires a current feature to play out. According to one embodiment of the invention, the type and timing fields 602, 604 of the packet are appropriately set to reflect that the packet is a resynchronization packet.

The resynchronization packet allows resynchronization of the current media position of the server to the current media position of the client. The two media positions may differ when the rate in which media is rendered by the server 100 is different from the rate in which media is rendered by the client. Generally, the rate in which the client 102 renders the movie is slower that the media server's rate. The resynchronization process allows resynchronization of the video, audio, and overlay media positions to ensure that the new play mode is invoked from the appropriate place.

Upon receipt of the resynchronization packet by the client 102, the client transmits its current media position over the control connection 106. The current media position is received by the server module 300 and passed to the demultiplexer module 852 in the video transfer object 310. In step 816, the demultiplexer module 852 resynchronizes its media position to the client's current media position. Once resynchronized, the demultiplexer unit 852 may return data chunks from the identified media position according to the changed play mode. For example, if the new play mode is a fast forward mode, the demultiplexer module 852 only returns video keyframes for transmitting over the video channel 110. Alternatively, all frames may be transmitted over the video channel, but at an increased rate. According to one embodiment of the invention, no audio nor overlay packets are transmitted during the fast forward mode. Alternatively, fast forwarded audio and/or overlay packets are also transmitted in addition to the fast forwarded video. Additional resynchronization details are provided in the above-referenced U.S. Application entitled Interactive Multichannel Data Distribution System.

Figure 9A:
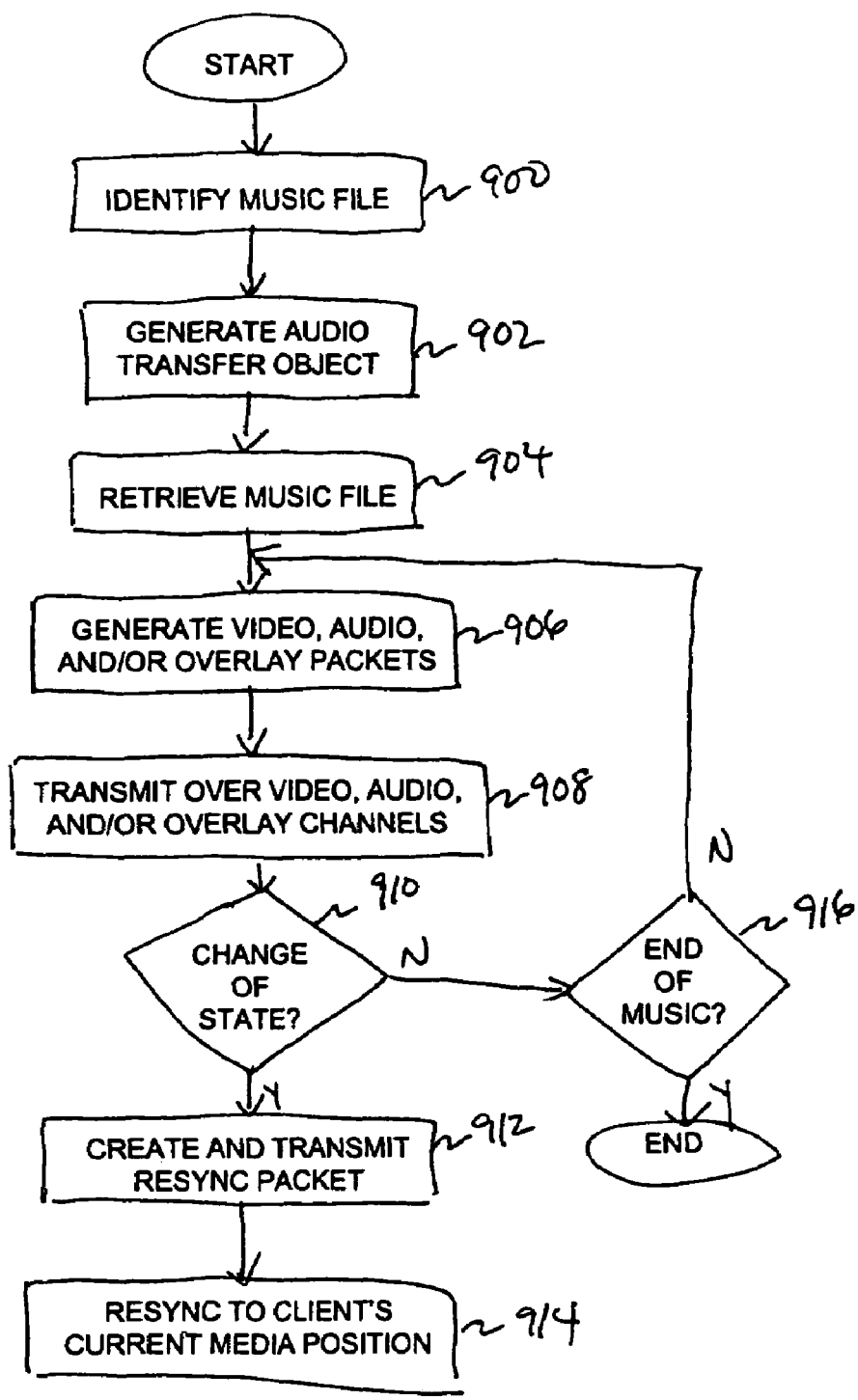
FIGS. 9A-9B are respectively a flow diagram and a schematic block diagram illustrating the transfer of music utilizing the multiple media connections and improved media transfer protocol according to one embodiment of the invention.
Figure 9B:
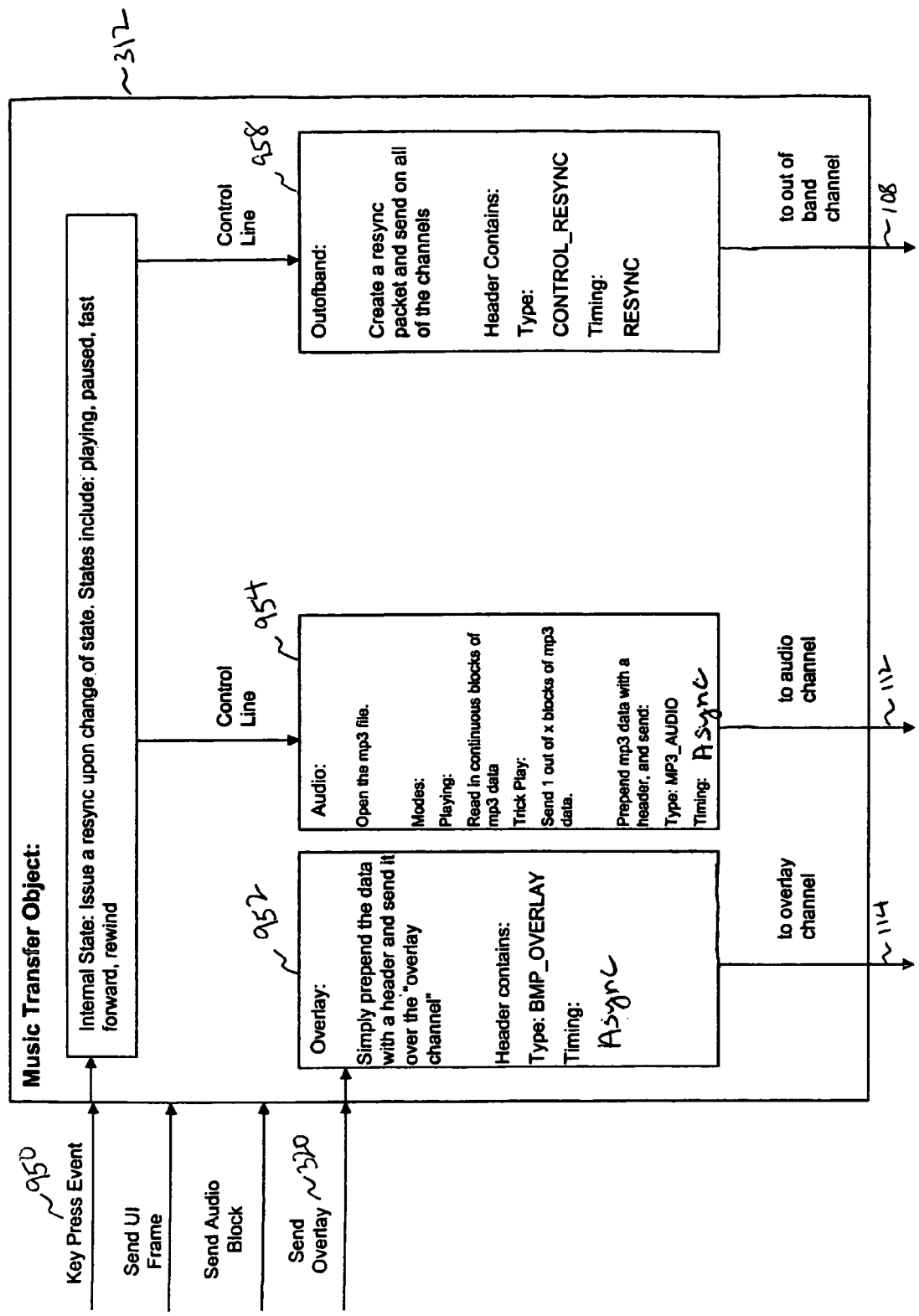

FIGS. 9A-9B are respectively a flow diagram and a schematic block diagram illustrating the transfer of music utilizing the multiple media connections and improved media transfer protocol according to one embodiment of the invention. In step 900, the media server module 300 identifies an appropriate music file from the media database 304 that is to be transferred based on a current user selection. The media server module 300 transmits to the network transport module 302 a command 306 to generate a music transfer object. The command 306 indicates that the type of media to be transferred is music, and further includes a path of the music file that is to be transferred. In response, the network transport module 302 generates the music transfer object 312 in step 902. In step 904, the music transfer object 312 retrieves the indicated music file from the media database 304.

In step 906, the music transfer object 312 generates an audio packet 954 based on an audio block read from the retrieved music file, and in step 908, transmits the audio packet over the audio channel 112. According to one embodiment of the invention, the music transfer object 312 may further encode and compress the data contained in the audio block to generate an audio chunk in the event that the audio data needs transcoding. For example, if a WMA file is being played to a client that only supports MP3, the audio block decodes the WMA audio and re-encodes it in MP3 audio. In generating the audio packet 954, the audio transfer object 312 sets the type field 602 of the audio packet to an appropriate audio type, and the timing field 604 to an appropriate timing mode. According to one embodiment of the invention, the timing field of the audio packet is set to indicate an asynchronous mode. In this manner, the client renders the audio packet as soon as it is received.

Along with the generating and transferring of audio packets, the UI transfer object 308 may also concurrently receive UI frames and/or the music transfer object 312 may concurrently receive, via API command 320, overlay data transmitted from the media server module 300. In the event that such UI frames and/or overlay data are received, the UI transfer object 308 and/or music transfer object 312 respectively generates corresponding video and/or overlay packets 754, 952 and transmits these packets respectively over the video and/or overlay channels 110, 114. According to one embodiment of the invention, the timing field of the corresponding video and/or overlay packets is set to indicate an asynchronous mode.

In step 910, a determination is made as to whether a change of state has occurred based on a received key press event 950. If no change of state is detected, audio packets are transmitted in the current play state until the end of the music as is determined in step 916.

Upon the detection of a change of play state, the music transfer object 312 creates and transmits, in step 912, a resynchronization out-of-band packet 958 over the out-of-band channel 108 (or control channel 106) and the audio channel 112. According to one embodiment of the invention, the type and timing fields 602, 604 of the packet are appropriately set to reflect that the packet is a resynchronization packet.

Upon receipt of the resynchronization packet by the client 102, the client transmits its current media position over the control connection 106. The current media position is received by the server module 300 and passed to the music transfer object 312. In step 914, the music transfer object 312 resynchronizes its media position to the client's current media position. Once resynchronized, audio blocks starting from the identified media position may be transmitted according to the changed play mode. According to one embodiment of the invention, if the play mode is a fast forward mode, only one out of X number of audio blocks are transmitted over the audio channel 112. Alternatively, contiguous audio blocks may be transmitted over the audio channel, but at an increased rate.

Figure 10A:
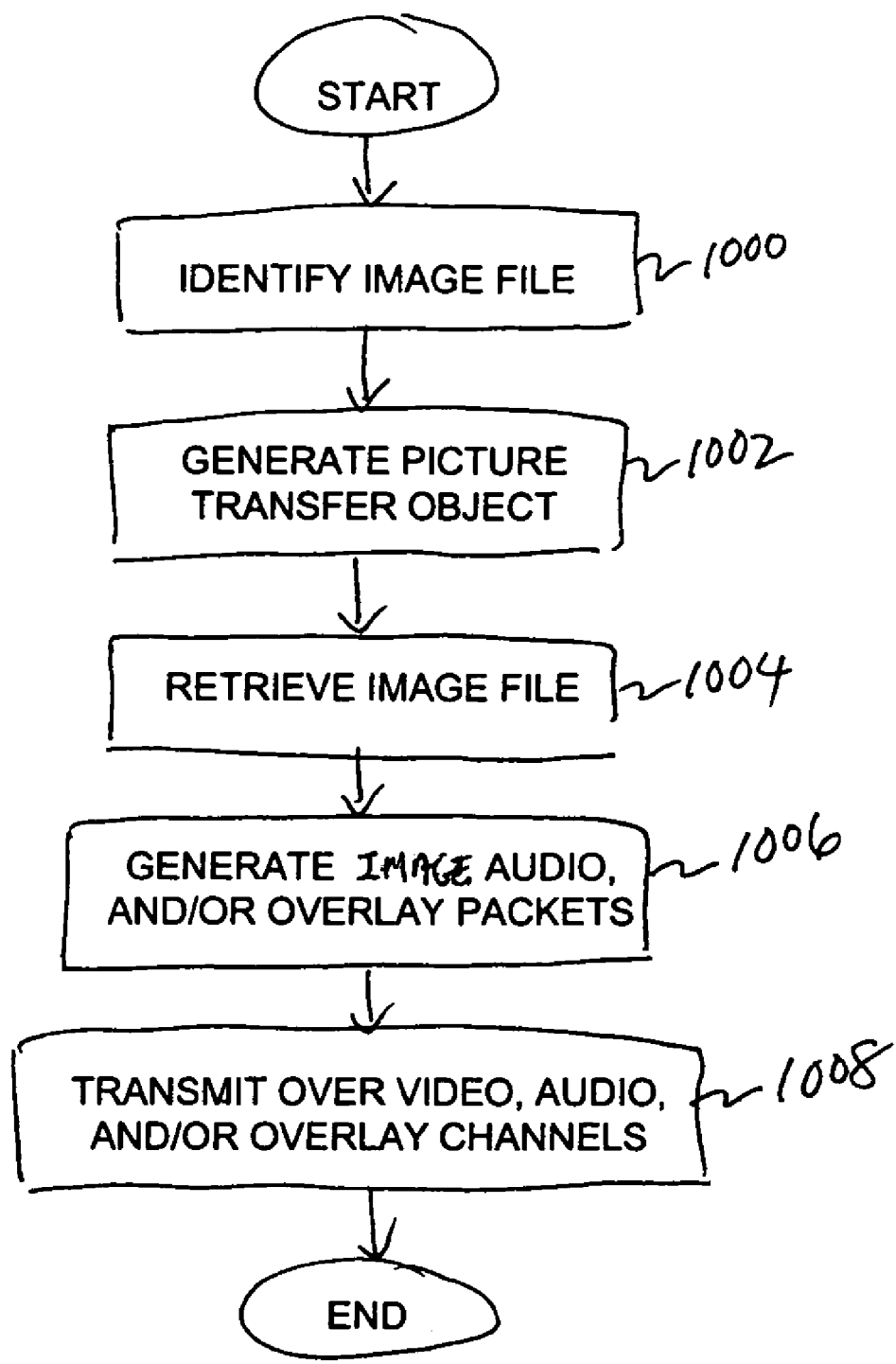
FIGS. 10A-10B are respectively a flow diagram and a schematic block diagram illustrating the transfer of pictures utilizing the multiple media connections and improved media transfer protocol according to one embodiment of the invention.
Figure 10B:
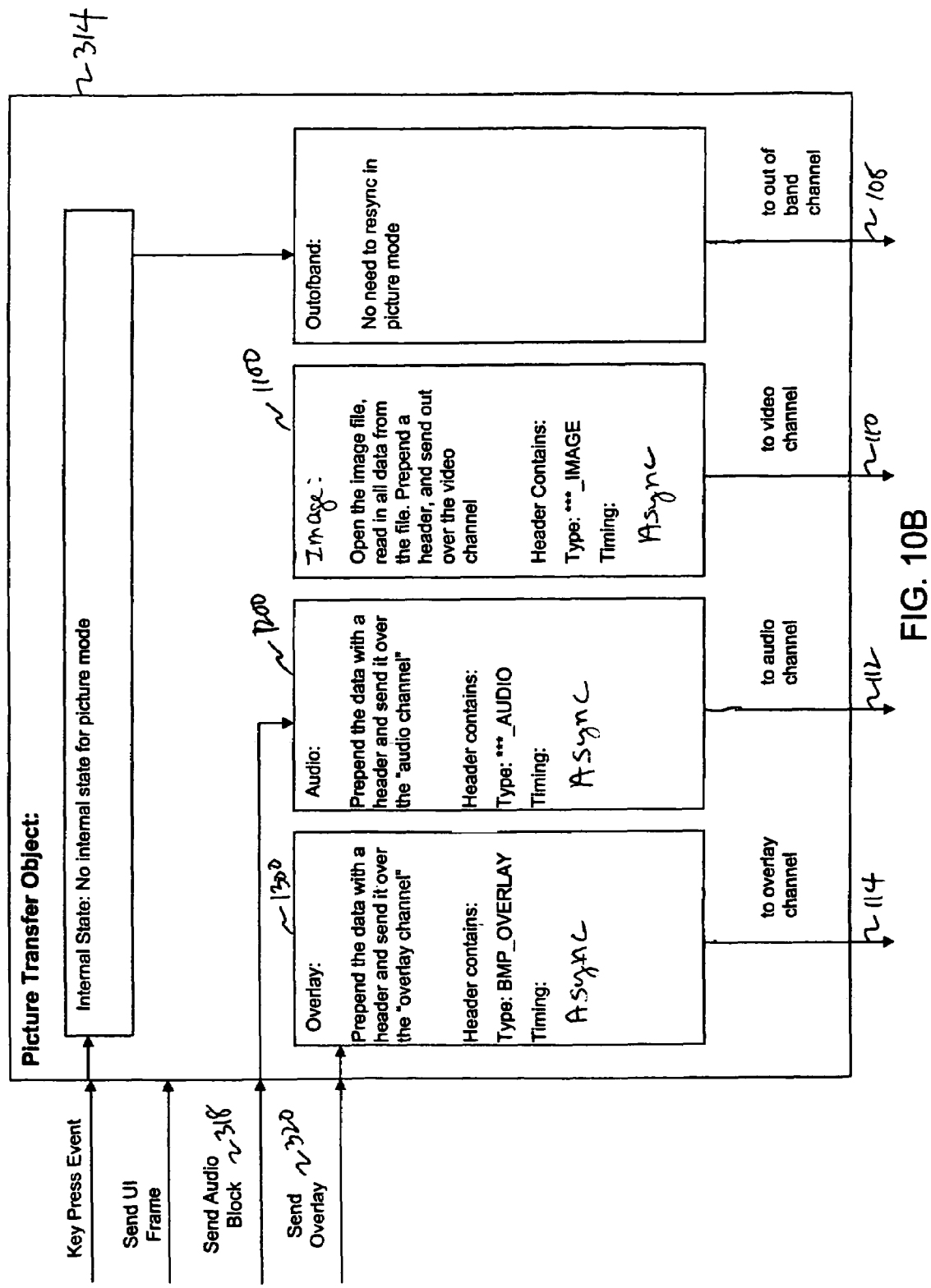

FIGS. 10A-10B are respectively a flow diagram and a schematic block diagram illustrating the transfer of pictures utilizing the multiple media connections and improved media transfer protocol according to one embodiment of the invention. In step 1000, the media server module 300 identifies an appropriate image file from the media database 304 that is to be transferred based on a current user selection. The media server module 300 transmits to the network transport module 302 a command 306 to generate a picture transfer object. The command 306 indicates that the type of media to be transferred is an image, and further includes a path of the image file that is to be transferred. In response, the network transport module 302 generates the picture transfer object 314 in step 1002. In step 1004, the picture transfer object 314 retrieves the indicated image file from the media database 304.

In step 1006, the picture transfer object 312 generates an image packet 1100 (FIG. 10B), and in step 1008, transmits the image packet over the video channel 110. Alternatively, the image packet may be transmitted over the overlay channel 114.

In generating the image packet 1100, the picture transfer object 314 opens the image file, uses the image data to generate the image packet, and prepends a header to the image packet. The type field 602 of the image packet is set to an appropriate image type, and the timing field 604 set to an asynchronous mode. In this manner, the client renders the image packet as soon as it is received.

Alternatively, the picture transfer object may encode the image as a video chunk and transmit the image as video over the video channel.

The picture transfer object 314 may also concurrently receive audio bocks and/or overlay data transmitted from the media server module 300 using the appropriate API commands 318, 320. In the event that such audio blocks and/or overlay data are received, the picture transfer object 314 generates corresponding audio and/or overlay packets 1200, 1300 and transmits these packets respectively over the audio and/or overlay channels 112, 114.

Figure 11A:
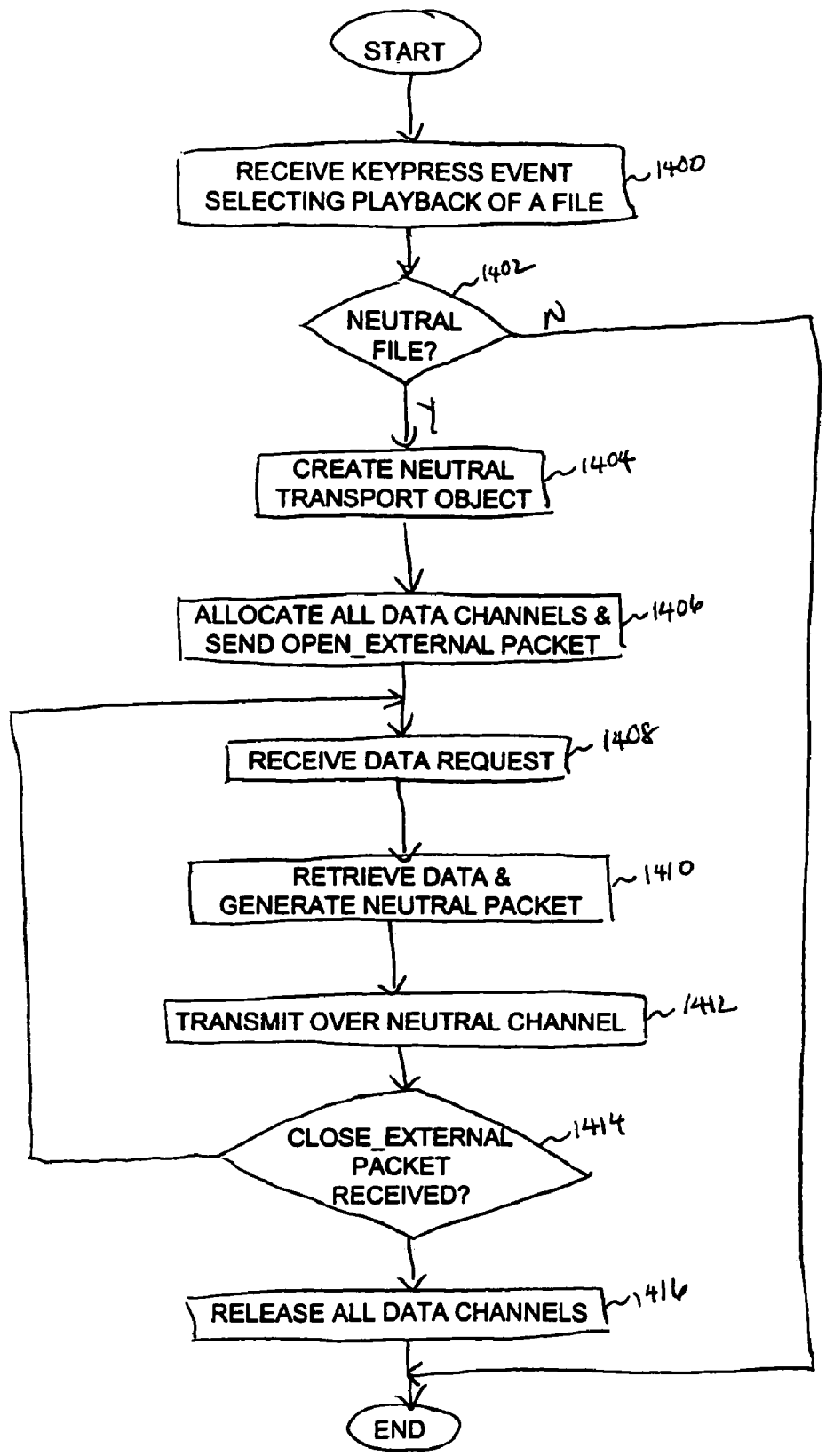
FIGS. 11A-11B are respectively a flow diagram and a schematic block diagram illustrating the transfer of neutral media files utilizing the multiple media connections and improved media transfer protocol according to one embodiment of the invention.
Figure 11B:
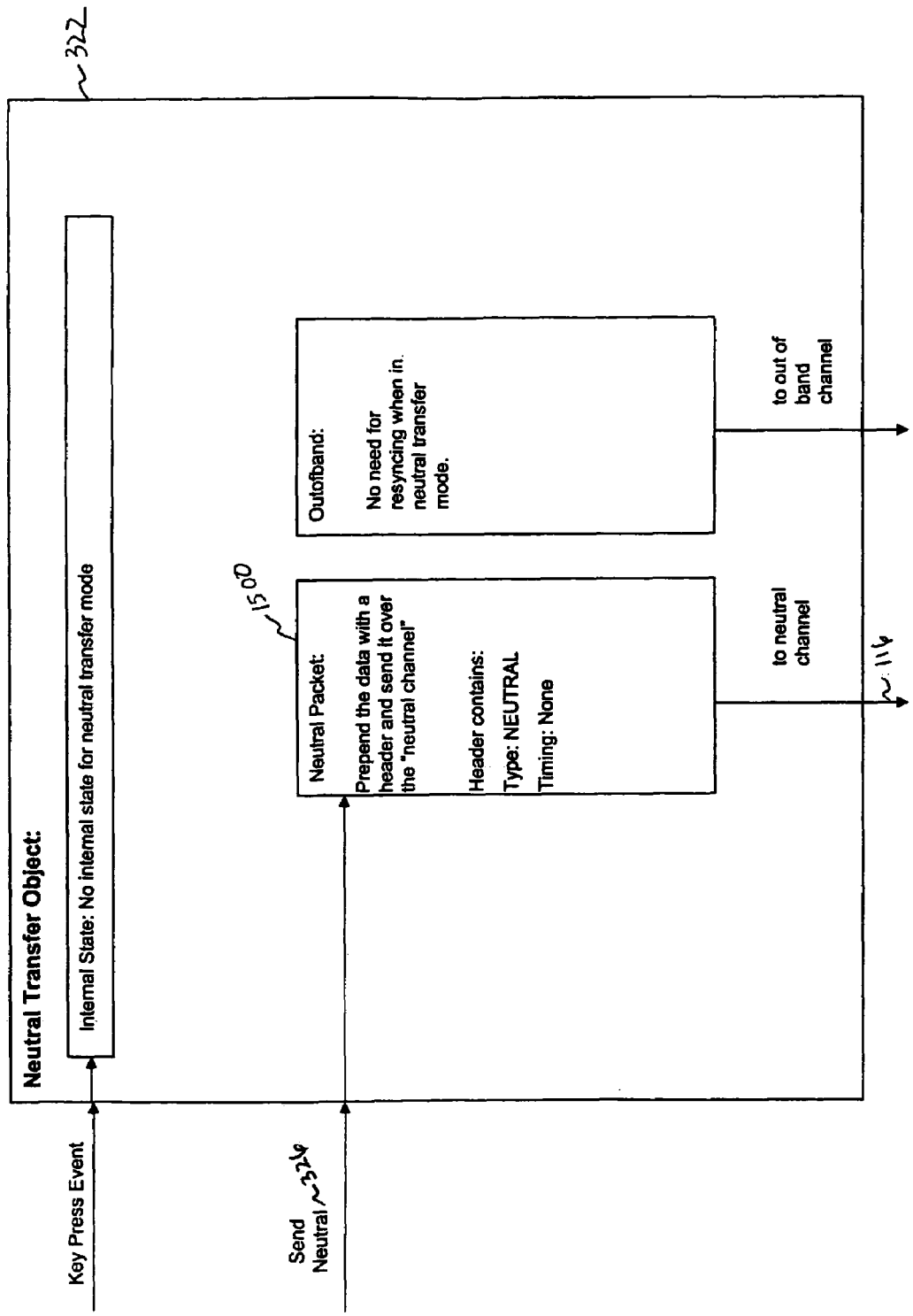

FIGS. 11A-11B are respectively a flow diagram and a schematic block diagram illustrating the transfer of neutral media files utilizing the multiple media connections and improved media transfer protocol according to one embodiment of the invention. In step 1400, the media server module 300 receives a keypress event selecting playback of a particular media file. In step 1402, the media server module 300 determines whether the selected file is a neutral file intended for neutral transport. Such a determination may be made, for example, based on metadata that is stored for the selected file in the media database 304.

Upon a determination that the file is a neutral file, the media server module 300 transmits to the network transport module 302 a command 306 to generate a neutral transfer object. According to one embodiment, the command indicates that the type of file to be transferred is a neutral file, and further includes a path of the neutral file that is to be transferred. In response, the network transport module 302 generates the neutral transfer object 316 in step 1404. In step 1406, the neutral transfer object 322 allocates all data channels and transmits an OPEN_EXTERNAL packet over the control channel 106. The allocations of all the data channels including the video, audio, and overlay channels 110, 112, 114, restricts access to such channels to ensure that no other media is transferred to the client while the neutral file transfer is occurring.

The OPEN_EXTERNAL packet is a control packet that contains the server IP, port, and URL to the file intended for neutral transport. The client 102 passes this information to the media rendering module 410 for use to establish a neutral connection to the server 100. If the media rendering module 410 resides in media player that is separate from the client, the neutral connection is established between the media player and the server.

Upon connection, data requests are made by the media rendering module 410 over a particular range of bytes. The server 100 receives each data request in step 1408, and in step 1410, retrieves the range of data and generates a neutral packet 1500 (FIG. 11B). The generated packet is then transmitted in step 1412.

In generating the neutral packet 1500, the neutral transfer object 322 inserts the retrieved bytes of data into the payload portion 612 of the packet and prepends a header to the payload portion. The type field 602 of the packet is set to indicate a neutral file type, and the timing field of the neutral packet is not set or set to none. There is no time specified because the server does not parse neutral files and does not dictate the timing of their playback.

In step 1414, a determination is a made as to whether a CLOSE_EXTERNAL control packet was received from the client 102. If the answer is NO, the server awaits a next data request from the client. Otherwise, the playback is complete, and the reserved data channels are released in step 1416.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A server configured to transfer video, and audio, media data to a client over separate video, and audio media transfer channels and to communicate with the client via a separate control channel, where the client includes a media timer and is configured to transmit timestamps associated with media being played by the client to the server via the control channel, the server comprising:
   a storage device containing video, and audio media data stored in at least one file;
   a media server module configured to identify video, and audio media data from within the at least one file for transmission over the separate video, and audio media transfer channels;
   a network transport module configured to create separate video, and audio media data packets and prepend header information to the media data packets, where the header information includes timing data generated for the specific media data packet by the network transport module,
   wherein the network transport module is also configured to transmit the video, and audio media data packets via the separate video, and audio media transfer channels according to different data rates; and
   wherein the timing data for each media data packet includes at least a synchronization mode field indicating a synchronization mode and a timestamp, where the server is configured to generate the timestamp based upon the synchronization mode.

2. The server of claim 1, wherein the media server module receives control information from the client over the control channel, processes the control information and identifies particular video, and audio media data stored in the at least one file in response and the network transport module transmits video, and audio, media data packets containing the particular video, and audio media data over the separate video and audio media transfer channels.

3. The server of claim 2, wherein, the overlay media data is subtitle data, and the synchronization mode field indicates that the overlay media data is synchronous timestamped data for rendering by a client when the media timer is greater than or equal to the timestamp.

4. The server of claim 2 wherein the control information further comprises control packets including a keypress type field and a button identifier field.

5. The server of claim 4 wherein the keypress type field indicates a button's current state and the button identifier field indicates a particular button that is invoked on a user input device.

6. The server of claim 1, wherein the synchronization mode field of the video media data packets indicates that the video data is streaming data for rendering immediately by the client asynchronously from the audio media data.

7. The server of claim 6, wherein the video data is for a user interface video prompting user interactions with the client.

8. The server of claim 1, wherein:
   the synchronization mode field of the video media data packets indicates that the video data is synchronous stream data for rendering by the client according to the timestamp; and
   the timing data further including a duration value, where the server is configured to generate the duration value as indicative of the duration of time in which the transmitted data is valid.

9. The server of claim 1 wherein
   the media server module is configured to receive a request to playback a particular media file, and the media server module is configured to identify the particular media file as a file having a neutral file type in which playback is unsupported by the server but is supported by the client; and
   a network transport module configured to receive from the client a particular range of data included in the particular media file, create a media transfer packet including the requested range of data, and transmit the media transfer packet over one of the plurality of a media transfer channel dedicated for transmitting media files having neutral file types.

10. The server of claim 1, wherein:
   the server is further configured to transfer overlay media data to a client over a separate overlay media transfer channel;
   the at least one file also includes overlay media data;
   the media server module is also configured to identify overlay media data from within the at least one file for transmission over the separate overlay media transfer channel;
   the network transport module is also configured to create separate overlay media data packets and prepend header information to the overlay media data packets, where the header information includes timing data generated for the specific overlay media data packet by the network transport module; and
   the timing data for each media data packet includes at least a synchronization mode field indicating a synchronization mode and a timestamp, where the server is configured to generate the timestamp based upon the synchronization mode.

* * * * *